(12) United States Patent
Bae et al.

(10) Patent No.: US 11,770,825 B2
(45) Date of Patent: Sep. 26, 2023

(54) METHOD, USER EQUIPMENT, PROCESSING DEVICE, STORAGE MEDIUM, AND COMPUTER PROGRAM FOR TRANSMITTING UPLINK CHANNEL, AND METHOD AND BASE STATION FOR RECEIVING UPLINK CHANNEL

(71) Applicant: LG Electronics Inc., Seoul (KR)

(72) Inventors: Duckhyun Bae, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/165,049

(22) Filed: Feb. 6, 2023

(65) Prior Publication Data

US 2023/0189260 A1 Jun. 15, 2023

Related U.S. Application Data

(63) Continuation of application No. PCT/KR2021/010415, filed on Aug. 6, 2021.

(30) Foreign Application Priority Data

Aug. 6, 2020 (KR) .................. 10-2020-0098856

(51) Int. Cl.
*H04W 72/1268* (2023.01)
*H04W 72/51* (2023.01)
*H04W 72/566* (2023.01)
*H04W 72/23* (2023.01)

(52) U.S. Cl.
CPC ....... *H04W 72/1268* (2013.01); *H04W 72/23* (2023.01); *H04W 72/51* (2023.01); *H04W 72/566* (2023.01)

(58) Field of Classification Search
CPC . H04W 72/1268; H04W 72/23; H04W 72/51; H04W 72/566
See application file for complete search history.

(56) References Cited

U.S. PATENT DOCUMENTS

2022/0225380 A1\* 7/2022 Zhang ................... H04L 1/1854
2022/0240295 A1\* 7/2022 Gao ....................... H04L 5/0048

\* cited by examiner

*Primary Examiner* — Kyaw Z Soe
(74) *Attorney, Agent, or Firm* — Fish & Richardson P.C.

(57) ABSTRACT

UE: on the basis of a first PUCCH and a second PUCCH having a priority order lower than the priority order of the first PUCCH overlapping each other in a time, and the first PUCCH satisfying a first time condition, performs transmission of the first PUCCH and cancels transmission of the second PUCCH; and on the basis of a first PUSCH and a second PUSCH having a priority order lower than the priority order of the first PUSCH overlapping each other in a time, and the first PUSCH satisfying a second time condition, performs transmission of the first PUSCH and cancels transmission of the second PUSCH, wherein the time length T_B for the second time condition is longer than the time length T_A for the first time condition.

15 Claims, 13 Drawing Sheets

METHOD, USER EQUIPMENT, PROCESSING DEVICE, STORAGE MEDIUM, AND COMPUTER PROGRAM FOR TRANSMITTING UPLINK CHANNEL, AND METHOD AND BASE STATION FOR RECEIVING UPLINK CHANNEL

CROSS-REFERENCE TO RELATED APPLICATIONS

This application is a continuation of International Application No. PCT/KR2021/010415, filed on Aug. 6, 2021, which claims the benefit of Korean Patent Application No. 10-2020-0098856, filed on Aug. 6, 2020. The disclosures of the prior applications are incorporated by reference in their entirety.

TECHNICAL FIELD

The present disclosure relates to a wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

SUMMARY

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

The objects to be achieved with the present disclosure are not limited to what has been particularly described hereinabove and other objects not described herein will be more clearly understood by persons skilled in the art from the following detailed description.

In an aspect of the present disclosure, there is provided a method of transmitting an uplink channel by a user equipment (UE) in a wireless communication system. The method may include: based on that a first physical uplink control channel (PUCCH) and a second PUCCH having a lower priority than a priority of the first PUCCH overlap in time and that the first PUCCH satisfies a first time condition, performing transmission of the first PUCCH and canceling transmission of the second PUCCH; and based on that a first physical uplink shared channel (PUSCH) and a second PUSCH having a lower priority than a priority of the first PUSCH overlap in time and that the first PUSCH satisfies a second time condition, performing transmission of the first PUSCH and cancelling transmission of the second PUSCH. A time length $T\_B$ for the second time condition may be longer than a time length $T\_A$ for the first time condition.

In another aspect of the present disclosure, there is provided a UE configured to transmit an uplink channel in a wireless communication system. The UE may include: at least one transceiver; at least one processor; and at least one computer memory operably connected to the at least one processor and configured to store instructions that, when executed, cause the at least one processor to perform operations. The operations may include: based on that a first PUCCH and a second PUCCH having a lower priority than a priority of the first PUCCH overlap in time and that the first PUCCH satisfies a first time condition, performing transmission of the first PUCCH and canceling transmission of the second PUCCH; and based on that a first PUSCH and a second PUSCH having a lower priority than a priority of the first PUSCH overlap in time and that the first PUSCH satisfies a second time condition, performing transmission of the first PUSCH and cancelling transmission of the second PUSCH. A time length $T\_B$ for the second time condition may be longer than a time length $T\_A$ for the first time condition.

In another aspect of the present disclosure, there is provided a processing device in a wireless communication system. The processing device may include: at least one processor; and at least one computer memory operably connected to the at least one processor and configured to store instructions that, when executed, cause the at least one processor to perform operations. The operations may include: based on that a first PUCCH and a second PUCCH having a lower priority than a priority of the first PUCCH overlap in time and that the first PUCCH satisfies a first time condition, performing transmission of the first PUCCH and canceling transmission of the second PUCCH; and based on that a first PUSCH and a second PUSCH having a lower priority than a priority of the first PUSCH overlap in time and that the first PUSCH satisfies a second time condition, performing transmission of the first PUSCH and cancelling transmission of the second PUSCH. A time length $T\_B$ for the second time condition may be longer than a time length T_A for the first time condition.

In another aspect of the present disclosure, there is provided a computer-readable storage medium. The computer-readable storage medium may be configured to store at least one computer program including instructions that, when executed by at least one processor, cause the at least one processor to perform operations for a UE. The operations may include: based on that a first PUCCH and a second PUCCH having a lower priority than a priority of the first PUCCH overlap in time and that the first PUCCH satisfies a first time condition, performing transmission of the first PUCCH and canceling transmission of the second PUCCH; and based on that a first PUSCH and a second PUSCH having a lower priority than a priority of the first PUSCH overlap in time and that the first PUSCH satisfies a second time condition, performing transmission of the first PUSCH and cancelling transmission of the second PUSCH. A time length T_B for the second time condition may be longer than a time length T_A for the first time condition.

In another aspect of the present disclosure, there is provided a computer program stored in a computer program readable storage medium. The computer program may include at least one program code including instructions that, when executed, cause at least one processor to perform operations. The operations may include: based on that a first PUCCH and a second PUCCH having a lower priority than a priority of the first PUCCH overlap in time and that the first PUCCH satisfies a first time condition, performing transmission of the first PUCCH and canceling transmission of the second PUCCH; and based on that a first PUSCH and a second PUSCH having a lower priority than a priority of the first PUSCH overlap in time and that the first PUSCH satisfies a second time condition, performing transmission of the first PUSCH and cancelling transmission of the second PUSCH. A time length T_B for the second time condition may be longer than a time length T_A for the first time condition.

In another aspect of the present disclosure, there is provided a method of receiving, by a base station (BS), an uplink channel from a UE in a wireless communication system. The method may include: based on that a first PUCCH and a second PUCCH having a lower priority than a priority of the first PUCCH overlap in time and that the first PUCCH satisfies a first time condition, performing reception of the first PUCCH and canceling reception of the second PUCCH; and based on that a first PUSCH and a second PUSCH having a lower priority than a priority of the first PUSCH overlap in time and that the first PUSCH satisfies a second time condition, performing reception of the first PUSCH and cancelling reception of the second PUSCH. A time length T_B for the second time condition may be longer than a time length T_A for the first time condition.

In a further aspect of the present disclosure, there is provided a BS configured to receive an uplink channel from a UE in a wireless communication system. The BS may include: at least one transceiver; at least one processor; and at least one computer memory operably connected to the at least one processor and configured to store instructions that, when executed, cause the at least one processor to perform operations. The operations may include: based on that a first PUCCH and a second PUCCH having a lower priority than a priority of the first PUCCH overlap in time and that the first PUCCH satisfies a first time condition, performing reception of the first PUCCH and canceling reception of the second PUCCH; and based on that a first PUSCH and a second PUSCH having a lower priority than a priority of the first PUSCH overlap in time and that the first PUSCH satisfies a second time condition, performing reception of the first PUSCH and cancelling reception of the second PUSCH. A time length T_B for the second time condition may be longer than a time length T_A for the first time condition.

In each aspect of the present disclosure, the time length T_B may be longer than the time length T_A by $d_{add}$, and $d_{add}$ may be an additional processing time reported by the UE to the BS.

In each aspect of the present disclosure, information on $d_{add}$ may be provided by the BS to the UE In each aspect of the present disclosure, the time length T_B may be longer than the time length T_A by $d_{add}$.

In each aspect of the present disclosure, based on that the first PUCCH overlapping in time with the second PUCCH satisfies the first time condition and does not satisfy the second time condition, uplink control information (UCI) included in the second PUCCH may be multiplexed on the first PUCCH.

In each aspect of the present disclosure, the first time condition may include that a time distance from a last symbol of a physical downlink control channel (PDCCH) scheduling a higher priority uplink channel to a start of the higher priority uplink channel is greater than or equal to T_A=T_proc,2+$d_1$, where T_proc,2 is a PUSCH preparation time for a processing capability of the UE, and dl is determined by a capability reported by the UE.

In each aspect of the present disclosure, the second time condition may include that the time distance from the last symbol of the PDCCH to the start of the higher priority uplink channel is greater than or equal to T_B=T_proc,2+$d_1+d_{add}$, where $d_{add}>0$.

In each aspect of the present disclosure, based on that a third PUCCH and a fourth PUSCH having a lower priority than a priority of the third PUCCH overlap in time and that the third PUCCH satisfies the first time condition, transmission of the third PUCCH may be performed, and transmission of the fourth PUSCH may be cancelled.

In each aspect of the present disclosure, based on that a third PUSCH and a fourth PUCCH having a lower priority than a priority of the third PUSCH overlap in time and that the third PUSCH satisfies the first time condition, transmission of the third PUSCH may be performed, and transmission of the fourth PUCCH may be cancelled.

In each aspect of the present disclosure, based on that the third PUSCH overlapping in time with the fourth PUCCH satisfies the first time condition and does not satisfy the second time condition, UCI included in the fourth PUCCH may be multiplexed on the third PUSCH.

The foregoing solutions are merely a part of the examples of the present disclosure and various examples into which the technical features of the present disclosure are incorporated may be derived and understood by persons skilled in the art from the following detailed description.

According to implementation(s) of the present disclosure, a wireless communication signal may be efficiently transmitted/received. Accordingly, the total throughput of a wireless communication system may be raised.

According to implementation(s) of the present disclosure, various services with different requirements may be efficiently supported in a wireless communication system.

According to implementation(s) of the present disclosure, delay/latency generated during radio communication between communication devices may be reduced.

The effects according to the present disclosure are not limited to what has been particularly described hereinabove and other effects not described herein will be more clearly understood by persons skilled in the art related to the present disclosure from the following detailed description

BRIEF DESCRIPTION OF THE DRAWINGS

The accompanying drawings, which are included to provide a further understanding of the present disclosure, illustrate examples of implementations of the present disclosure and together with the detailed description serve to explain implementations of the present disclosure.

DETAILED DESCRIPTION

Figure 1:
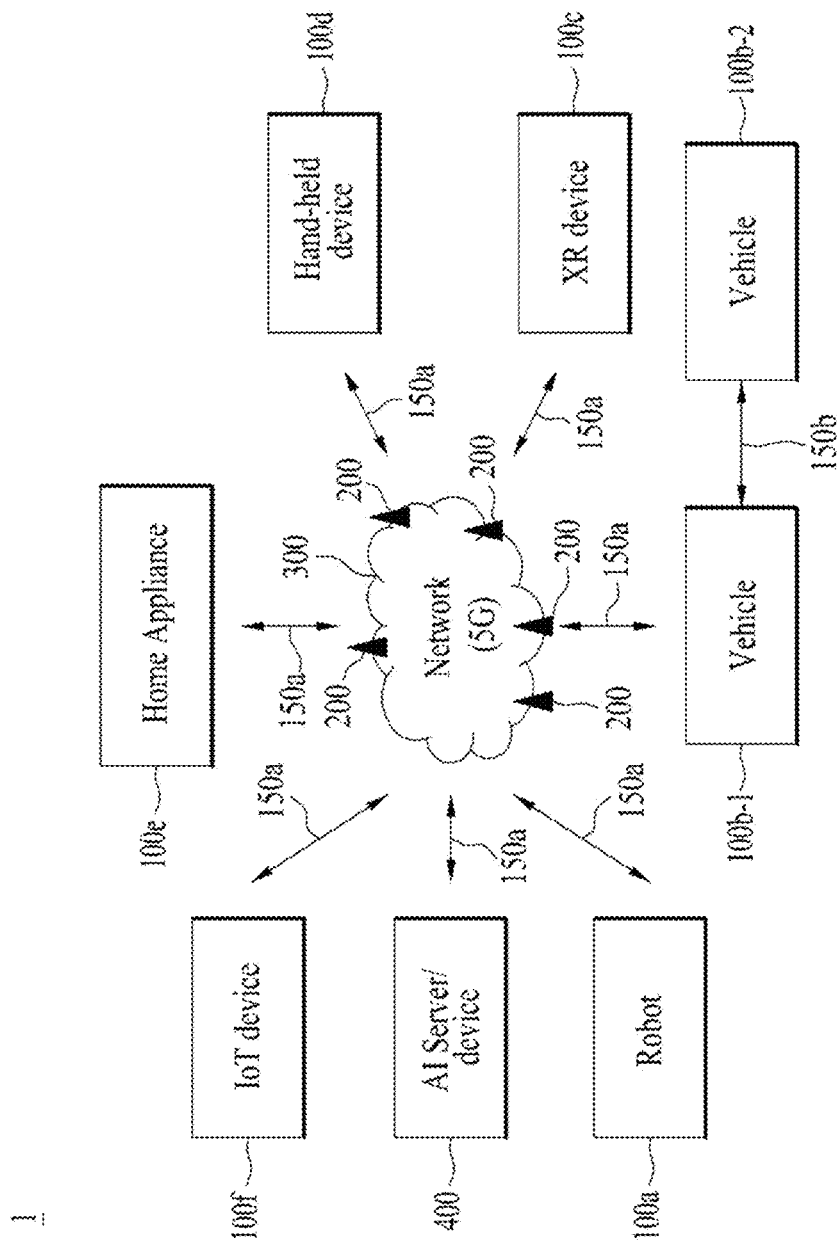
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a PSCell and 0 or more Scells. The PSCell is a primary Scell of the SCG. For a UE in RRC CONNECTED state, not configured with CA or DC, only one serving cell including only the Pcell is present. For a UE in RRC_CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An Scell indicated as the PUCCH Scell belongs to the Scell PUCCH group and PUCCH transmission of related UCI is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., a set of resource elements (REs)) that carry downlink control information (DCI), and the PDSCH refers to a set of time-frequency resources (e.g., a set of REs) that carry DL data. The PUCCH, PUSCH, and PRACH refer to a set of time-frequency resources (i.e., a set of REs) that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUCCH/PUSCH/PRACH, respectively. In addition, the meaning of "the BS transmits/receives the PBCH/PDCCH/PDSCH" is that the BS transmits the broadcast information/DCI/DL data on or through a PBCH/PDCCH/PDSCH, respectively.

In the present disclosure, a radio resource (e.g., a time-frequency resource) scheduled or configured for the UE by the BS for transmission or reception of PUCCH/PUSCH/PDSCH is also referred to as a PUCCH/PUSCH/PDSCH resource.

Since a communication device receives an SS/PBCH resource block (SSB), DMRS, CSI-RS, PBCH, PDCCH, PDSCH, PUSCH, and/or PUCCH in the form of radio signals on a cell, the communication device may not select and receive radio signals including only a specific physical channel or a specific physical signal through a radio frequency (RF) receiver, or may not select and receive radio signals without a specific physical channel or a specific physical signal through the RF receiver. In actual operations, the communication device receives radio signals on the cell via the RF receiver, converts the radio signals, which are RF band signals, into baseband signals, and then decodes physical signals and/or physical channels in the baseband signals using one or more processors. Thus, in some implementations of the present disclosure, not receiving physical signals and/or physical channels may mean that a communication device does not attempt to restore the physical signals and/or physical channels from radio signals, for example, does not attempt to decode the physical signals and/or physical channels, rather than that the communication device does not actually receive the radio signals including the corresponding physical signals and/or physical channels.

As more and more communication devices have required greater communication capacity, there has been a need for eMBB communication relative to legacy radio access technology (RAT). In addition, massive MTC for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to as a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless device may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150b (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
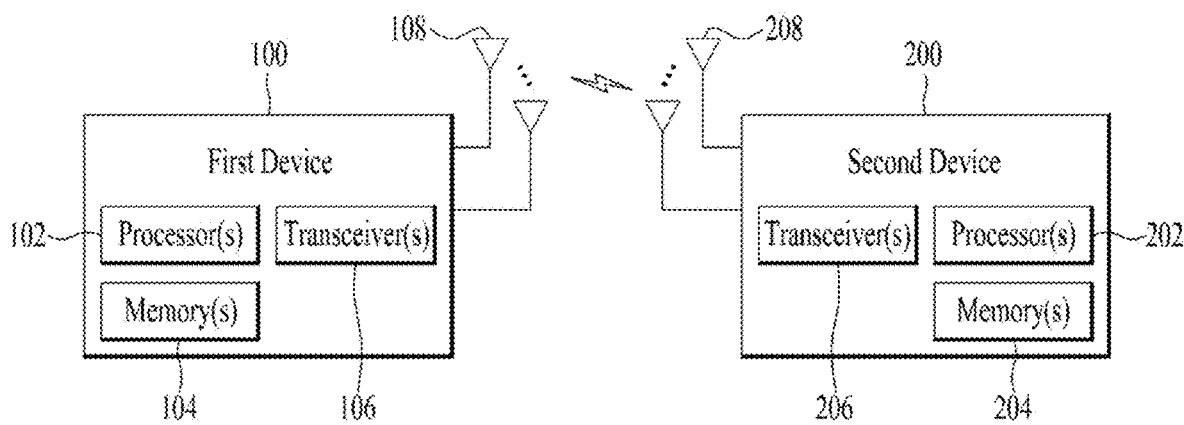
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the afore/below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the afore/below-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of Things for low-power communication as well as LTE, NR, and 6G communications. For example, NB-IoT technology may be an example of Low Power Wide Area Network (LPWAN) technology, and may be implemented by, but is limited to, standards such as LTE Cat NB1 and/or LTE Cat NB2.Additionally or alternatively, the wireless communication technology implemented in the wireless devices XXX and YYY of the present disclosure may perform communication based on the LTE-M technology. For example, the LTE-M technology may be an example of the LPWAN technology, and may be called by various names such as enhanced machine type communication (eMTC). For example, the LTE-M technology may be implemented by, but is not limited to, at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M. Additionally or alternatively, the wireless communication technology implemented in the wireless devices XXX and YYY of the present disclosure may include, but is not limited to, at least one of ZigBee, Bluetooth, and Low Power Wide Area Network (LPWAN) considering low-power communication. For example, the ZigBee technology may create personal area networks (PAN) related to small/low-power digital communications based on various standards such as IEEE 802.15.4, and may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in this document. The one or more processors 102 and 202 may generate messages, control information, data, or information according to the functions, procedures, proposals, and/or methods disclosed in this document. The one or more processors 102 and 202 may generate signals (e.g., baseband signals) including PDUs, SDUs, messages, control information, data, or information according to the functions, procedures, proposals, and/or methods disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in this document may be implemented using firmware or software, and the firmware or software may be configured to include the modules, procedures, or functions. Firmware or software configured to perform the functions, procedures, proposals, and/or methods disclosed in this document may be included in the one or more processors 102 and 202 or stored in the one or more memories 104 and 204 so as to be driven by the one or more processors 102 and 202. The functions, procedures, proposals, and/or methods disclosed in this document may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
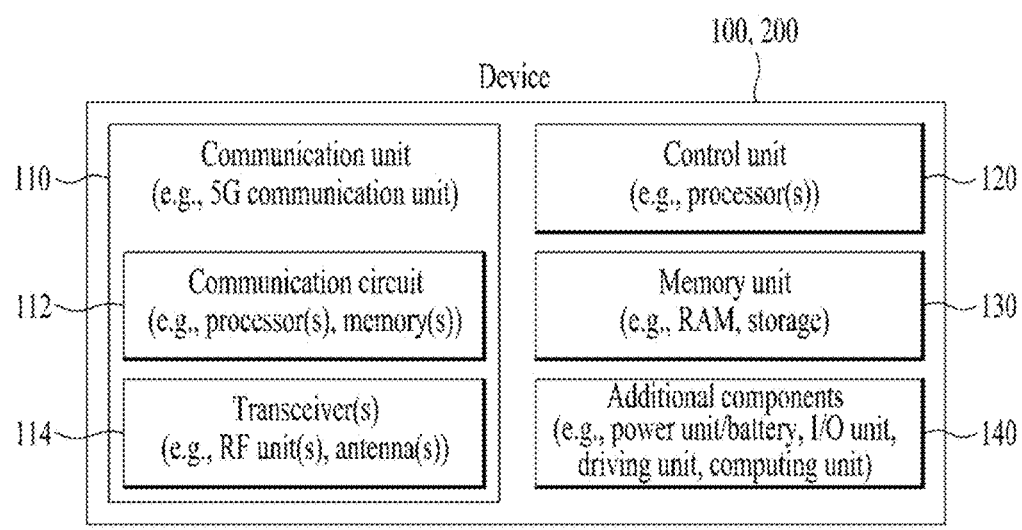
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable (non-transitory) storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

In the present disclosure, a computer program may include a program code stored on at least one computer-readable (non-volatile) storage medium and, when executed, configured to perform operations according to some implementations of the present disclosure or cause at least one processor to perform the operations according to some implementations of the present disclosure. The computer program may be provided in the form of a computer program product. The computer program product may include at least one computer-readable (non-volatile) storage medium A communication device of the present disclosure includes at least one processor; and at least one computer memory operably connectable to the at least one processor and configured to store instructions for causing, when executed, the at least one processor to perform operations according to example(s) of the present disclosure described later.

Figure 4:
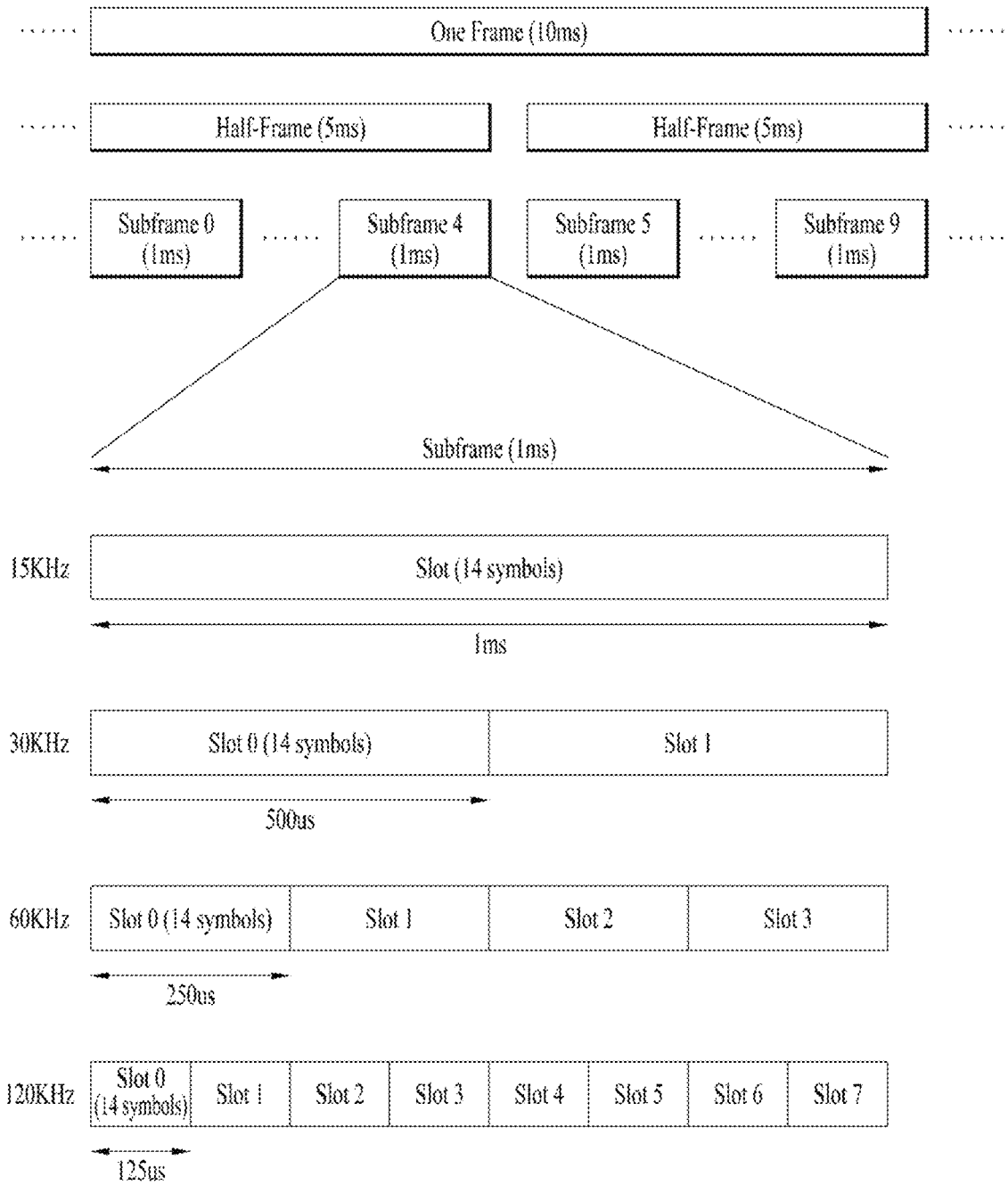
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each frame has a duration of $T_f=(\Delta f_{max}*N_f/100)*T_c=10$ ms and is divided into two half-frames of 5 ms each. A basic time unit for NR is $T_c=1/(\Delta f_{max}*N_f)$ where $\Delta f_{max}=480*10^3$ Hz and $N_f=4096$. For reference, a basic time unit for LTE is $T_s=1/(\Delta f_{ref}*N_{f,ref})$ where $\Delta f_{ref}=15*10^3$ Hz and $N_{f,ref}=2048$. $T_c$ and $T_f$ have the relationship of a constant $\kappa=T_s/T_c=64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f=2^u*15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f=2^u*15$ kHz.

TABLE 2

| u | $N_{symb}^{slot}$ | $N_{slot}^{frame,u}$ | $N_{slot}^{subframe,u}$ |
|---|---|---|---|
| 2 | 12 | 40 | 4 |

For a subcarrier spacing configuration u, slots may be indexed within a subframe in ascending order as follows: $n^u_s \in \{0, \ldots, n^{subframe,u}_{slot}-1\}$ and indexed within a frame in ascending order as follows: $n^u_{s,f} \in \{0, \ldots, n^{frame,u}_{slot}-1\}$.

Figure 5:
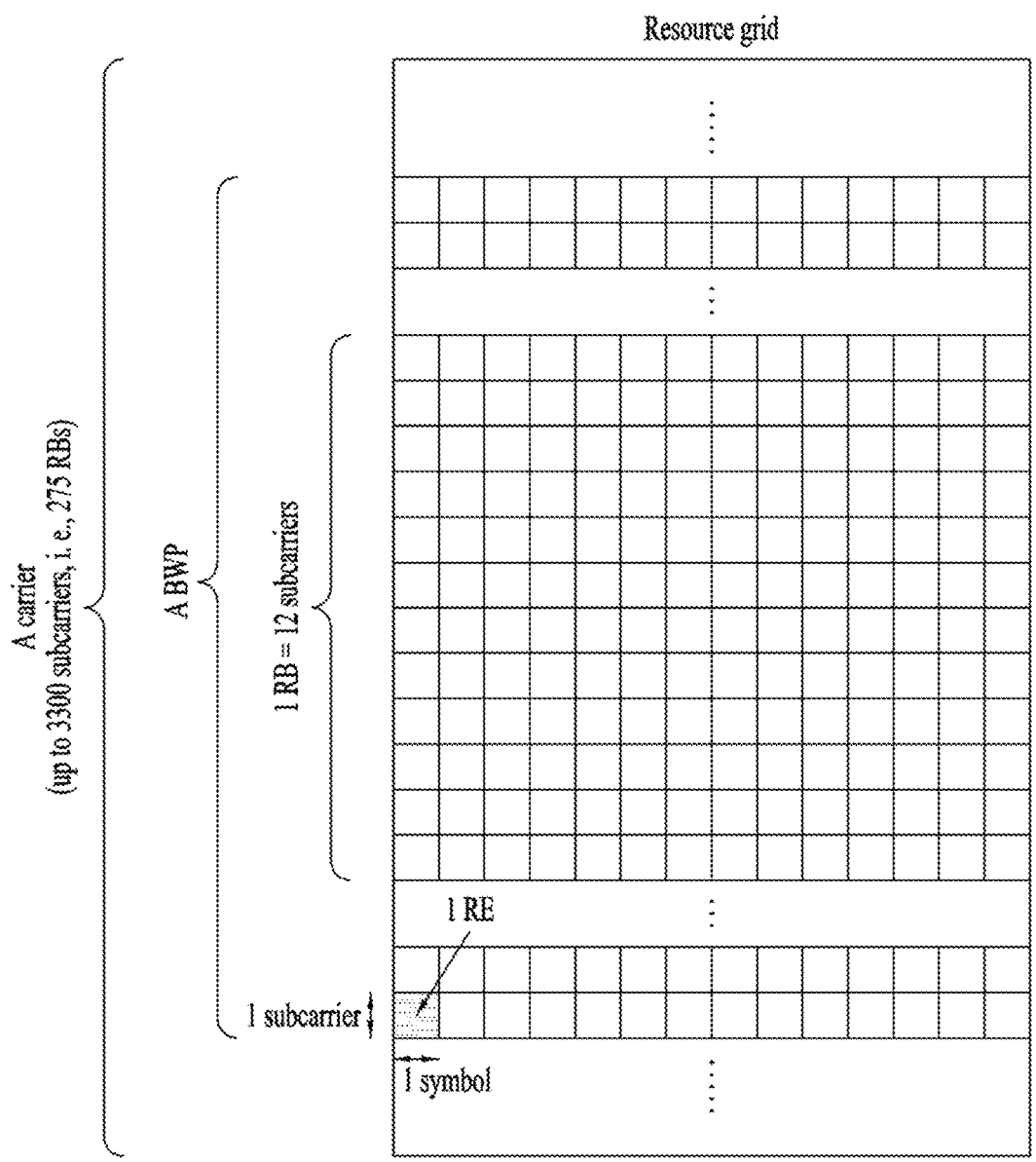
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs for subcarrier spacing configuration u are defined within a bandwidth part (BWP) and numbered from 0 to $N^{size,u}_{BWP,i}-1$, where i is a number of the BWP. The relation between a PRB $n_{PRB}$ in a BWP i and a CRB $n^u_{CRB}$ is given by: $n^u_{PRB} = n^u_{CRB} + N^{size,u}_{BWP,i}$, where $N^{size}_{BWP,i}$ is a CRB in which the BWP starts relative to CRB 0. The BWP includes a plurality of consecutive RBs in the frequency domain. For example, the BWP may be a subset of contiguous CRBs defined for a given numerology $u_i$ in the BWP i on a given carrier. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

For each serving cell in a set of DL BWPs or UL BWPs, the network may configure at least an initial DL BWP and one (if the serving cell is configured with uplink) or two (if supplementary uplink is used) initial UL BWPs. The network may configure additional UL and DL BWPs. For each DL BWP or UL BWP, the UE may be provided with the following parameters for the serving cell: i) an SCS; ii) a CP; iii) a CRB $N^{start}_{BWP} = O_{carrier} + RB_{start}$ and the number of contiguous RBs $N^{size}_{BWP} = L_{RB}$ provided by an RRC parameter locationAndBandwidth, which indicates an offset $RB_{set}$ and a length $L_{RB}$ as a resource indicator value (RIV) on the assumption of $N^{start}_{BWP} = 275$, and a value $O_{carrier}$ provided by an RRC parameter offsetToCarrier for the SCS; an index in the set of DL BWPs or UL BWPs; a set of BWP-common parameters; and a set of BWP-dedicated parameters.

Virtual resource blocks (VRBs) may be defined within the BWP and indexed from 0 to $N^{size,u}_{BWP,i}-1$, where i denotes a BWP number. The VRBs may be mapped to PRBs according to non-interleaved mapping. In some implementations, VRB n may be mapped to PRB n for non-interleaved VRB-to-PRB mapping.

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

NR frequency bands are defined as two types of frequency ranges, i.e., FR1 and FR2. FR2 is also referred to as millimeter wave (mmW). The following table shows frequency ranges within which NR may operate.

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/deactivation of configured scheduling (CS), etc. DCI including information about resource allocation of the DL-SCH is referred to as PDSCH scheduling DCI, and DCI including information about resource allocation of the UL-SCH is referred to as PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

When a PDCCH on one serving cell schedules a PDSCH or a PUSCH on another serving cell, it is referred to cross-carrier scheduling. Cross-carrier scheduling with a carrier indicator field (CIF) may allow a PDCCH on a serving cell to schedule resources on another serving cell. When a PDSCH on a serving cell schedules a PDSCH or a PUSCH on the serving cell, it is referred to as self-carrier scheduling. When the cross-carrier scheduling is used in a cell, the BS may provide information about a cell scheduling the cell to the UE. For example, the BS may inform the UE whether a serving cell is scheduled by a PDCCH on another (scheduling) cell or scheduled by the serving cell. If the serving cell is scheduled by the other (scheduling) cell, the BS may inform the UE which cell signals DL assignments and UL grants for the serving cell. In the present disclosure, a cell carrying a PDCCH is referred to as a scheduling cell, and a cell where transmission of a PUSCH or a PDSCH is scheduled by DCI included in the PDCCH, that is, a cell carrying the PUSCH or PDSCH scheduled by the PDCCH is referred to as a scheduled cell.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH means a physical layer UL channel for UCI transmission. The PUCCH carries UCI. The UCI includes the following information.

Scheduling request (SR): Information that is used to request a UL-SCH resource.

Hybrid automatic repeat request (HARQ)—acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CRI), an SS/PBCH resource block indicator (SSBRI), and a layer indicator (LI). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 4.

(0) PUCCH format 0 (PF0 or F0)

Supported UCI payload size: up to K bits (e.g., K=2)

Number of OFDM symbols constituting a single PUCCH: 1 to X symbols (e.g., X=2)

Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.

Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH format 1 (PF1 or F1)

Supported UCI payload size: up to K bits (e.g., K=2)

Number of OFDM symbols constituting a single PUCCH: Y to Z symbols (e.g., Y=4 and Z=14)

Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.

Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH format 2 (PF2 or F2)

Supported UCI payload size: more than K bits (e.g., K=2)

Number of OFDM symbols constituting a single PUCCH: 1 to X symbols (e.g., X=2)

Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.

Configuration for PUCCH format 2 includes the following parameters for a corresponding PUCCH resource: the number of PRBs, the number of symbols for PUCCH transmission, and/or the first symbol for PUCCH transmission.

(3) PUCCH format 3 (PF3 or F3)

Supported UCI payload size: more than K bits (e.g., K=2)
Number of OFDM symbols constituting a single PUCCH: Y to Z symbols (e.g., Y=4 and Z=14)

Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).

Configuration for PUCCH format 3 includes the following parameters for a corresponding PUCCH resource: the number of PRBs, the number of symbols for PUCCH transmission, and/or the first symbol for PUCCH transmission.

(4) PUCCH format 4 (PF4 or F4)

Supported UCI payload size: more than K bits (e.g., K=2)
Number of OFDM symbols constituting a single PUCCH: Y to Z symbols (e.g., Y=4 and Z=14)

Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.

Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 4

| PUCCH format | Length in OFDM symbols $N_{symb}^{PUCCH}$ | Number of bits | Usage | Etc. |
| --- | --- | --- | --- | --- |
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >1 | HARQ, CSI [SR] | DFT-s-OFDM (no UE multiplexing) |
| 4 | 4-14 | >2 | HARQ, CSI, [SR] | DFT-s-OFDM (Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$.

PUCCH resource set #0, if the number of UCI bits=<2
PUCCH resource set #1, if 2<the number of UCI bits=<$N_1$
...
PUCCH resource set #(K-1), if $N_{K-2}$<the number of UCI bits=<$N_{K-1}$ Here, K represents the number of PUCCH resource sets (K>1) and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 4).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL grant(s). The BS may allocate the DL resources to the UE using SPS. The BS may configure a periodicity of configured DL assignment through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail.

*Resource Allocation by PDCCH: dynamic grant/assignment

The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index $I_{MCS}$, resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. HARQ information on a DL-SCH or UL-SCH may include a new information indicator (NDI), transport block size (TBS), redundancy version (RV), and HARQ process ID (i.e., HARQ process number). The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCL format 0_2. Some implementations of the present disclosure may be applied to DL data reception based on DCI format 1_2.

Figure 6:
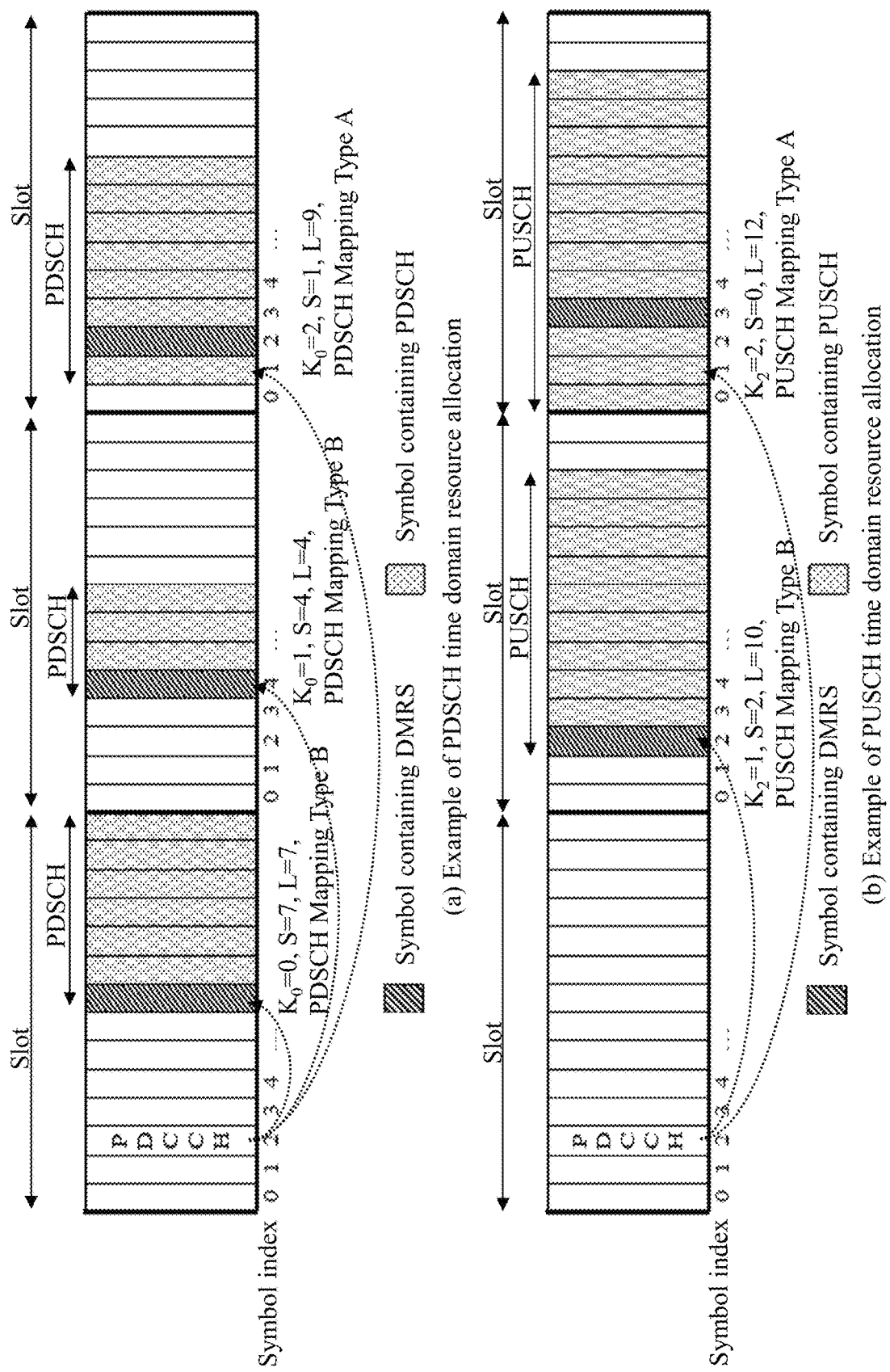
FIG. 6 illustrates an example of PDSCH time domain resource assignment (TDRA) caused by a PDCCH and an example of PUSCH TDRA caused by the PDCCH.

FIG. 6 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-TimeDomainAllocationList is applied as the allocation table for the PDSCH. Predefined default PUSCH time domain allocation is applied as the allocation table for the PUSCH or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according to a fixed/predefined rule (e.g., refer to 3GPP TS 38.214).

In PDSCH time domain resource configurations, each indexed row defines a DL assignment-to-PDSCH slot offset $K_0$, a start and length indicator value SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. The PDSCH/PUSCH mapping type has two mapping types: mapping type A and mapping type B. In PDSCH/PUSCH mapping type A, a demodulation reference signal (DMRS) is mapped to a PDSCH/PUSCH resource based on the start of a slot. According to other DMRS parameters, one or two symbols among the symbols of the PDSCH/PUSCH resource may be used as DMRS symbol(s). For example, in PDSCH/PUSCH mapping type A, the DMRS is located on the third symbol (symbol #2) or the fourth symbol (symbol #3) in the slot according to RRC signaling. In PDSCH/PUSCH mapping type B, the DMRS is mapped based on the first OFDM symbol of the PDSCH/PUSCH resource. According to other DMRS parameters, one or two symbols from the first symbol of the PDSCH/PUSCH resource may be used as DMRS symbol(s). For example, in PDSCH/PUSCH mapping type B, the DMRS is located on the first symbol allocated for PDSCH/PUSCH. In the present disclosure, the PDSCH/PUSCH mapping type may be referred to as a mapping type or a DMRS mapping type. For example, in the present disclosure, PUSCH mapping type A may be referred to as mapping type A or DMRS mapping type A, and PUSCH mapping type B may be referred to as mapping type B or DMRS mapping type B.

The scheduling DCI includes an FDRA field that provides assignment information about RBs used for the PDSCH or the PUSCH. For example, the FDRA field provides information about a cell for PDSCH or PUSCH transmission to the UE, information about a BWP for PDSCH or PUSCH transmission, and/or information about RBs for PDSCH or PUSCH transmission.

*Resource Allocation by RRC

As mentioned above, there are two types of transmission without dynamic grant: configured grant Type 1 and configured grant Type 2. In configured grant Type 1, a UL grant is provided by RRC and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC per serving cell and per BWP. Multiple configurations may be active simultaneously on different serving cells.

When configured grant Type 1 is configured, the UE may be provided with the following parameters through RRC signaling:

cs-RNTI corresponding to a CS-RNTI for retransmission;

periodicity corresponding to a periodicity of configured grant Type 1;

timeDomainOffset indicating an offset of a resource with respect to system frame number (SFN)=0 in the time domain;

timeDomainAllocation value m that provides a row index m+1 pointing to the allocation table, indicating a combination of the start symbol S, the length L, and the PUSCH mapping type;

frequencyDomainAllocation that provides frequency domain resource allocation; and mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIT) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+ N*periodicity) modulo (1024*numberOfSlotsPerFrame*numberOfSymbolsPerSlot), for all N>=0, where numberOfSlotsPerFrame and numberOfSymbolsPerSlot indicate the number of consecutive slots per frame and the number of consecutive OFDM symbols per slot, respectively (refer to Table 1 and Table 2).

For configured grant Type 2, the UE may be provided with the following parameters by the BS through RRC signaling:

cs-RNTI corresponding to a CS-RNTI for activation, deactivation, and retransmission; and periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying:
[(SFN*numberOfSlotsPerFrame*numberOfSymbolsPerSlot)+ (slot number in the frame*numberOfSymbolsPerSlot)+symbol number in the slot]=[(SFN$_{start\ time}$ *numberOfSlotsPerFrame*numberOfSymbolsPerSlot+ slot$_{start\ time}$*numberOfSymbolsPerSlot+symbol$_{start\ time}$)+ N*periodicity] modulo (1024*numberOfSlotsPerFrame*numberOfSymbolsPerSlot), for all N>=0, where SFN$_{start\ time}$, slot$_{start\ time}$, and symbol$_{start\ time}$ represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

In some scenarios, a parameter harq-ProcID-Offset and/or a parameter harq-ProcID-Offset2 used to derive HARQ process IDs for configured UL grants may be further provided by the BS to the UE. harq-ProcID-Offset is an offset of a HARQ process for a configured grant for operation with shared spectrum channel access, and harq-ProcID-Offset2 is an offset of a HARQ process for a configured grant. In the present disclosure, cg-RetransmissionTimer is a duration after (re)transmission based on a configured grant in which the UE should not autonomously perform retransmission based on the HARQ process of the (re)transmission. cg-RetransmissionTimer may be provided to the UE by the BS when retransmission on a configured UL grant is configured. For configured grants configured with neither harq-ProcID-Offset nor cg-RetransmissionTimer, the HARQ process ID associated with the first symbol of UL transmission may be derived from the following equation: HARQ Process ID= [floor(CURRENT_symbol/periodicity)] modulo nrof-HARQ-Processes. For configured UL grants with harq-ProcID-Offset2, the HARQ process ID associated with the first symbol of UL transmission may be derived from the following equation: HARQ Process ID=[floor(CURRENT_ symbol/periodicity)] modulo nrofHARQ-Processes+harq-ProcID-Offset2, where CURRENT_symbol= (SFN*numberOfSlotsPerFrame*numberOfSymbolsPerSlot+ slot number in the frame*numberOfSymbolsPerSlot+ symbol number in the slot), and numberOfSlotsPerFrame and numberOfSymbolsPerSlot denote the number of consecutive slots per frame and the number of consecutive OFDM symbols per slot, respectively. For configured UL grants with cg-RetransmissionTimer, the UE may select a HARQ process ID from among HARQ process IDs available for the configured grant configuration.

On DL, the UE may be configured with semi-persistent scheduling (SPS) per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling used to configure a semi-persistent transmission:

cs-RNTI corresponding to a CS-RNTI for activation, deactivation, and retransmission;

nrofHARQ-Processes that provides the number of HARQ processes for SPS;

periodicity that provides a periodicity of configured DL assignment for SPS;

n1PUCCH-AN that provides a HARQ resource for a PUCCH for SPS (the network configures the HARQ resource as format 0 or format 1, and the actual PUCCH resource is configured by PUCCH-Config and referred to in n1PUCCH-AN by the ID thereof).

After DL assignment is configured for SPS, the UE may consider sequentially that N-th DL assignment occurs in a slot satisfying: (numberOfSlotsPerFrame*SFN+slot number in the frame)=[(numberOfSlotsPerFrame*SFN$_{start\ time}$+ slot$_{start\ time}$)+N*periodicity*numberOfSlotsPerFrame/10] modulo (1024*numberOfSlotsPerFrame), where SFN$_{start\ time}$ and slot$_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

In some scenarios, a parameter harq-ProcID-Offset used to derive HARQ process IDs for configured DL assignments may be further provided by the BS to the UE. harq-ProcID-Offset is an offset of a HARQ process for SPS. For configured DL assignments without harq-ProcID-Offset, a HARQ process ID associated with a slot in which DL transmission starts may be determined from the following equation: HARQ Process ID=[floor (CURRENT_slot*10/ (numberOfSlotsPerFrame*periodicity))] modulo nrof-HARQ-Processes, where CURRENT_slot= [(SFN*numberOfSlotsPerFrame)+slot number in the frame], and numberOfSlotsPerFrame denotes the number of consecutive slots per frame. For configured DL assignments with harq-ProcID-Offset, a HARQ process ID associated with a slot in which DL transmission starts may be determined from the following equation: HARQ Process ID= [floor (CURRENT_slot/periodicity)] modulo nrofHARQ-Processes+harq-ProcID-Offset, where CURRENT_slot= [(SFN*numberOfSlotsPerFrame)+slot number in the frame], and numberOfSlotsPerFrame denotes the number of consecutive slots per frame.

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 5 and Table 6. Table 5 shows an example of special fields for DL SPS and UL grant Type 2 scheduling activation PDCCH validation, and Table 6 shows an example of special fields for DL SPS and UL grant Type 2 scheduling release PDCCH validation.

TABLE 5

| | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 6

| | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and UL grant for DL SPS or UL grant Type 2, and a corresponding MCS are provided by resource assignment fields (e.g., a TDRA field providing a TDRA value m, an FDRA field providing frequency resource block assignment, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

Figure 7:
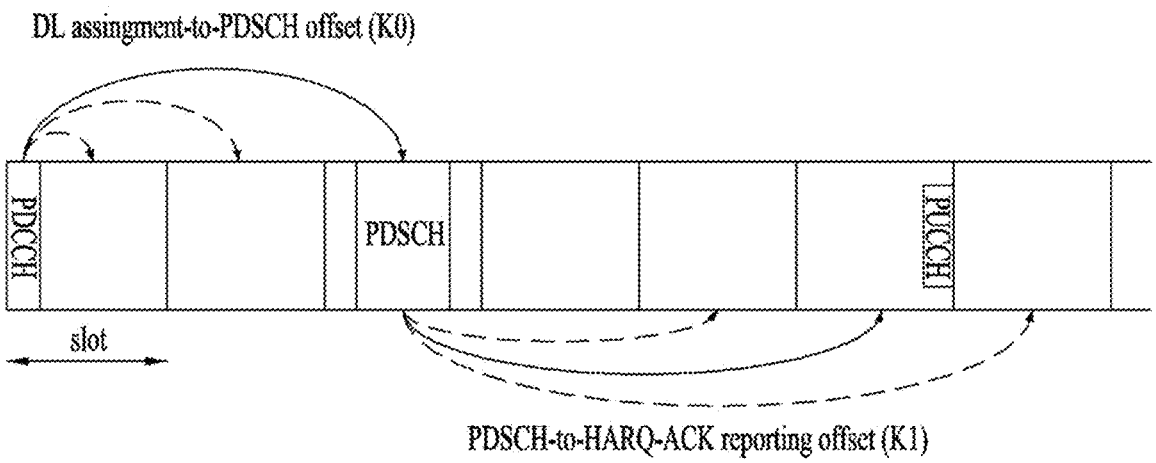
FIG. 7 illustrates a hybrid automatic repeat request-acknowledgement (HARQ-ACK) transmission/reception procedure.

FIG. 7 illustrates a HARQ-ACK transmission/reception procedure.

Referring to FIG. 7, the UE may detect a PDCCH in a slot n. Next, the UE may receive a PDSCH in a slot n+K0 according to scheduling information received through the PDCCH in the slot n and then transmit UCI through a PUCCH in a slot n+K1. In this case, the UCI includes a HARQ-ACK response for the PDSCH.

The DCI (e.g., DCI format 1_0 or DCI format 1_1) carried by the PDCCH for scheduling the PDSCH may include the following information.

FDRA: FDRA indicates an RB set allocated to the PDSCH.

TDRA: TDRA indicates a DL assignment-to-PDSCH slot offset K0, the start position (e.g., symbol index S) and length (e.g., the number of symbols, L) of the PDSCH in a slot, and the PDSCH mapping type. PDSCH mapping Type A or PDSCH mapping Type B may be indicated by TDRA. For PDSCH mapping Type A, the DMRS is located in the third symbol (symbol #2) or fourth symbol (symbol #3) in a slot. For PDSCH mapping Type B, the DMRS is allocated in the first symbol allocated for the PDSCH.

PDSCH-to-HARQ_feedback timing indicator: This indicator indicates K1.

If the PDSCH is configured to transmit a maximum of one TB, a HARQ-ACK response may consist of one bit. If the PDSCH is configured to transmit a maximum of 2 TBs, the HARQ-ACK response may consist of 2 bits when spatial bundling is not configured and one bit when spatial bundling is configured. When a HARQ-ACK transmission timing for a plurality of PDSCHs is designated as slot n+K1, UCI transmitted in slot n+K1 includes a HARQ-ACK response for the plural PDSCHs.

In the present disclosure, a HARQ-ACK payload consisting of HARQ-ACK bit(s) for one or plural PDSCHs may be referred to as a HARQ-ACK codebook. The HARQ-ACK codebook may be categorized as a semi-static HARQ-ACK codebook and a dynamic HARQ-ACK codebook according to a HARQ-ACK payload determination scheme.

In the case of the semi-static HARQ-ACK codebook, parameters related to a HARQ-ACK payload size that the UE is to report are semi-statically determined by a (UE-specific) higher layer (e.g., RRC) signal. The HARQ-ACK payload size of the semi-static HARQ-ACK codebook, e.g., the (maximum) HARQ-ACK payload (size) transmitted through one PUCCH in one slot, may be determined based on the number of HARQ-ACK bits corresponding to a combination (hereinafter, bundling window) of all DL carriers (i.e., DL serving cells) configured for the UE and all DL scheduling slots (or PDSCH transmission slots or PDCCH monitoring slots) for which the HARQ-ACK transmission timing may be indicated. That is, in a semi-static HARQ-ACK codebook scheme, the size of the HARQ-ACK codebook is fixed (to a maximum value) regardless of the number of actually scheduled DL data. For example, DL grant DCI (PDCCH) includes PDSCH-to-HARQ-ACK timing information, and the PDSCH-to-HARQ-ACK timing information may have one (e.g., k) of a plurality of values. For example, when the PDSCH is received in slot #m and the PDSCH-to-HARQ-ACK timing information in the DL grant DCI (PDCCH) for scheduling the PDSCH indicates k, the HARQ-ACK information for the PDSCH may be transmitted in slot #(m+k). As an example, k∈{1, 2, 3, 4, 5, 6, 7, 8}. When the HARQ-ACK information is transmitted in slot #n, the HARQ-ACK information may include possible maximum HARQ-ACK based on the bundling window. That is, HARQ-ACK information of slot #n may include HARQ-ACK corresponding to slot #(n-k). For example, when k∈{1, 2, 3, 4, 5, 6, 7, 8}, the HARQ-ACK information of slot #n may include HARQ-ACK corresponding to slot #(n-8) to slot #(n-1) regardless of actual DL data reception (i.e., HARQ-ACK of a maximum number). Here, the HARQ-ACK information may be replaced with a HARQ-ACK codebook or a HARQ-ACK payload. A slot may be understood/replaced as/with a candidate occasion for DL data reception. As described in the example, the bundling window may be determined based on the PDSCH-to-HARQ-ACK timing based on a HARQ-ACK slot, and a PDSCH-to-HARQ-ACK timing set may have predefined values (e.g., {1, 2, 3, 4, 5, 6, 7, 8}) or may be configured by higher layer (RRC) signaling. In the case of the dynamic HARQ-ACK codebook, the HARQ-ACK payload size that the UE is to report may be dynamically changed by the DCI etc. In the dynamic HARQ-ACK codebook scheme, DL scheduling DCI may include a counter-DAI (i.e., c-DAI) and/or a total-DAI (i.e., t-DAI). Here, the DAI indicates a downlink assignment index and is used for the BS to inform the UE of transmitted or scheduled PDSCH(s) for which HARQ-ACK(s) are to be included in one HARQ-ACK transmission. Particularly, the c-DAI is an index indicating order between PDCCHs carrying DL scheduling DCI (hereinafter, DL scheduling PDCCHs), and t-DAI is an index indicating the total number of DL scheduling PDCCHs up to a current slot in which a PDCCH with the t-DAI is present.

In the NR system, a method of implementing a plurality of logical networks in a single physical network is considered. The logical networks need to support services with various requirements (e.g., eMBB, mMTC, URLLC, etc.). Accordingly, a physical layer of NR is designed to support a flexible transmission structure in consideration of the various service requirements. As an example, the physical layer of NR may change, if necessary, an OFDM symbol length (OFDM symbol duration) and a subcarrier spacing (SCS) (hereinafter, OFDM numerology). Transmission resources of physical channels may also be changed in a predetermined range (in units of symbols). For example, in NR, a PUCCH (resource) and a PUSCH (resource) may be configured to flexibly have a transmission length/transmission start timing within a predetermined range.

A PDCCH is transmitted through a control resource set (CORESET). One or more CORESETs may be configured for the UE. The CORESET consists of a set of PRBs with a duration of 1 to 3 OFDM symbols. The PRBs and a CORESET duration that constitute the CORESET may be provided to the UE through higher layer (e.g., RRC) signaling. A set of PDCCH candidates in the configured CORESET(s) is monitored according to corresponding search space sets. In the present disclosure, monitoring implies decoding (called blind decoding) each PDCCH candidate according to monitored DCI formats. A master information block (MIB) on a PBCH provides parameters (e.g., CORESET #0 configuration) for monitoring a PDCCH for scheduling a PDSCH carrying system information block 1 (SIB1) to the UE. The PBCH may also indicate that there is no associated SIB1. In this case, the UE may be provided with not only a frequency range in which the UE may assume that there is no SSB associated with SSB1 but also other frequencies to search for an SSB associated with SIB1. CORESET #0, which is a CORESET for scheduling SIB1 at least, may be configured by the MIB or dedicated RRC signaling.

A set of PDCCH candidates monitored by the UE is defined in terms of PDCCH search space sets. The search space set may be a common search space (CSS) set or a UE-specific search space (USS) set. Each CORESET configuration is associated with one or more search space sets, and each search space set is associated with one CORESET configuration. The search space set is determined based on the following parameters provided by the BS to the UE.

controlResourceSetID: an identifier for identifying a CORESET p associated with a search space set s.

monitoringSlotPeriodicityAndOffset: a PDCCH monitoring periodicity of slots $k_s$ and a PDCCH monitoring offset of $o_s$ slots to configure slots for PDCCH monitoring.

duration: a duration of $T_s < k_s$ slots indicating a number of slots in which the search space set s exists.

monitoringSymbolsWithinSlot: a PDCCH monitoring pattern within a slot, indicating first symbol(s) of the CORESET within a slot for PDCCH monitoring.

nrofCandidates: a number of PDCCH candidates per CCE aggregation level.

searchSpaceType: an indication that search space set s is either a CCE set or a USS set.

The parameter monitoringSymbolsWithinSlot may indicate the first symbol(s) for PDCCH monitoring in the slots configured for PDCCH monitoring (e.g., see monitoringSlotPeriodicityAndOffset and duration). For example, when monitoringSymbolsWithinSlot is a 14-bit parameter, the most significant (leftmost) bit may represent the first OFDM symbol in the slot, and the second most significant (leftmost) bit may represent the second OFDM symbol in the slot. In this way, the bits of monitoringSymbolsWithinSlot may represent the 14 OFDM symbols of the slot, respectively. For example, bit(s) set to 1 among the bits in monitoringSymbolsWithinSlot may identify the first symbol(s) of the CORESET in the slot.

A UE monitors PDCCH candidates in PDCCH monitoring occasions only. The UE determines a monitoring occasion on an active DL BWP from the PDCCH monitoring periodicity, the PDCCH monitoring offset, and the PDCCH monitoring pattern within a slot. In some implementations, for search space set s, the UE determines that a PDCCH monitoring occasion(s) existing in a slot with number $n^u_{s,f}$ in a frame with number $n_f$ if $(n_f * N^{frame,u}_{slot} + n^u_{s,f} - o_s)$ mod $k_s = 0$. The UE monitors PDCCH candidates for search space set s for $T_s$ consecutive slots, starting from slot $n^u_{s,f}$, and does not monitor PDCCH candidates for search space set s for the next $k_s - T_s$.

The following table shows search space sets, related RNTIs, and use cases thereof.

TABLE 7

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI or CS-RNTT(s) | User specific PDSCH decoding |

The following table shows DCI formats carried by a PDCCH.

TABLE 8

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |

TABLE 8-continued

| DCI format | Usage |
| --- | --- |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of PRB(s) and OFDM symbol(s) where UE cancels the corresponding UL transmission from the UE |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. For a CSS, DCI format 0_0 and DCI format 1_0 have fixed sizes after the BWP size is initially given by RRC. For a USS, DCI format 0_0 and DCI format 1_0 are fixed in size in fields other than a frequency domain resource assignment (FDRA) field, and the FDRA field may vary in size by configuration of a related parameter by the BS. In DCI format 0_1 and DCI format 1_1, the size of the DCI field may be changed by various RRC reconfigurations by the BS. DCI format 2_0 may be used to provide dynamic slot format information (e.g., SFI DCI) to the UE, DCI format 2_1 may be used to provide DL pre-emption information to the UE, and DCI format 2_4 may be used to indicate a UL resource on which the UE needs to cancel UL transmission.

In a wireless communication system including the BS and the UE, when the UE transmits UCI on a PUCCH, a PUCCH resource may overlap with another PUCCH resource or a PUSCH resource on the time axis. For example, (1) a PUCCH (resource) and a PUCCH (resource) (for different UCI transmission) or (2) a PUCCH (resource) and a PUSCH (resource) may overlap on the time axis (in the same slot) in terms of the same UE. The UE may not support PUCCH-PUCCH simultaneous transmission or PUCCH-PUSCH simultaneous transmission (according to restrictions on UE capability or according to configuration information received from the BS). In addition, the UE may not be allowed to simultaneously transmit a plurality UL channels within a predetermined time range.

In the present disclosure, methods of handling a plurality of UL channels when the UL channels that the UE should transmit are present in a predetermined time range are described. In the present disclosure, methods of handling UCI and/or data that should have been transmitted/received on the UL channels are also described. The following terms are used in a description of examples in the present disclosure.

UCI: UCI implies control information that the UE transmits on UL. The UCI includes multiple types of control information (i.e., UCI types). For example, the UCI may include HARQ-ACK (shortly, A/N or AN), SR, and/or CSI.

UCI multiplexing: UCI multiplexing may mean an operation of transmitting different UCIs (UCI types) on a common physical UL channel (e.g., a PUCCH or PUSCH). UCI multiplexing may include multiplexing of different UCIs (UCI types). For convenience, the multiplexed UCI is referred to as MUX UCI. Further, UCI multiplexing may include an operation performed in relation to MUX UCI. For example, UCI multiplexing may include a process of determining a UL channel resource to transmit MUX UCI.

UCI/data multiplexing: UCI/data multiplexing may mean an operation of transmitting UCI and data on a common physical UL channel (e.g., PUSCH). UCI/data multiplexing may include an operation of multiplexing UCI with data. For convenience, the multiplexed UCI/data is referred to as MUX UCI/data. Further, UCI/data multiplexing may include an operation performed in relation to MUX UCI/data. For example, UCI/data multiplexing may include a process of determining a UL channel resource to transmit MUX UCI/data.

Slot: Slot means a basic time unit or time interval for data scheduling. A slot includes a plurality of symbols. Here, a symbol may be an OFDM-based symbol (e.g., a CP-OFDM symbol or DFT-s-OFDM symbol).

Overlapping UL channel resource(s): Overlapping UL channel resource(s) mean UL channel (e.g., PUCCH or PUSCH) resource(s) overlapping (at least partially) with each other on the time axis within a predetermined time period (e.g., slot). Overlapping UL channel resource(s) may imply UL channel resource(s) before UCI multiplexing is performed. In the present disclosure, (at least partially) overlapping UL channels on the time axis are referred to as colliding UL channels in time or in the time domain.

Figure 8:
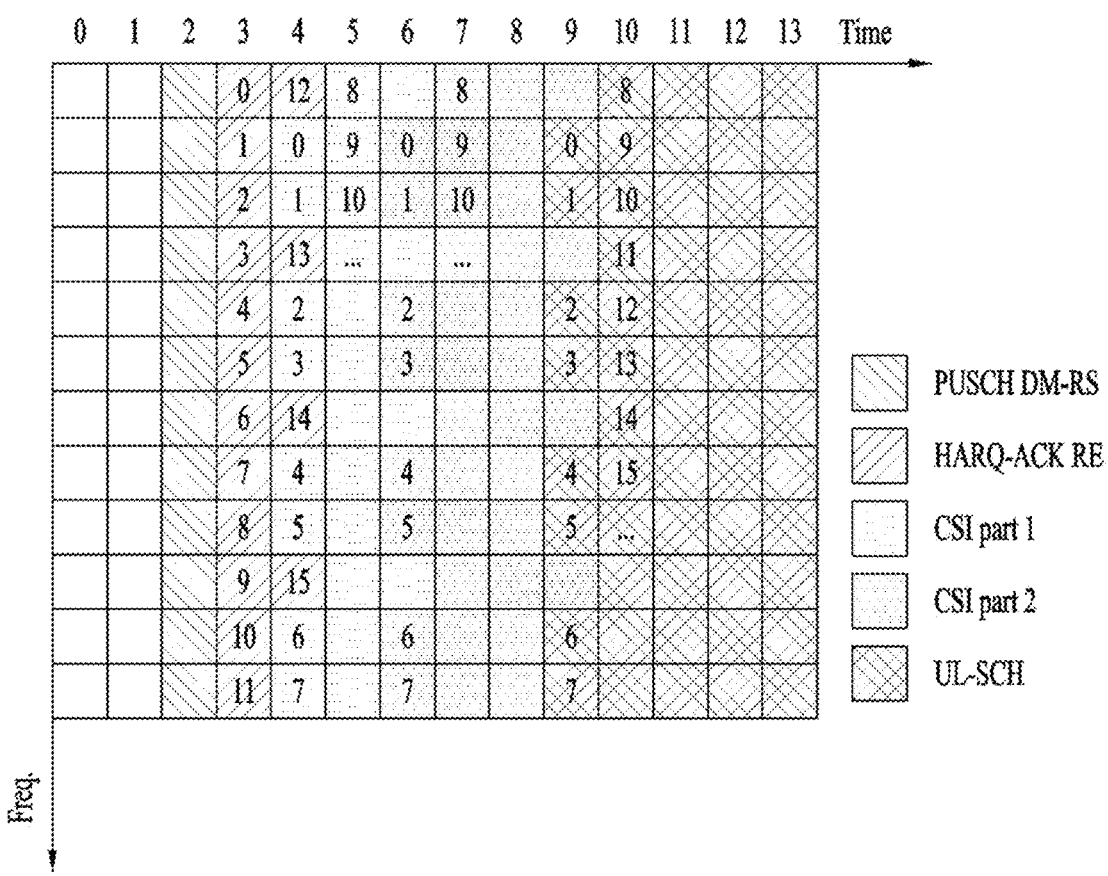
FIG. 8 illustrates an example of multiplexing uplink control information (UCI) with a PUSCH.

FIG. 8 illustrates an example of multiplexing UCI with a PUSCH. When PUCCH resource(s) and a PUSCH resource overlap in a slot and PUCCH-PUSCH simultaneous transmission is not configured, UCI may be transmitted on the PUSCH as illustrated. Transmission of the UCI on the PUSCH is referred to as UCI piggyback or PUSCH piggyback. Particularly, FIG. 8 illustrates the case in which HARQ-ACK and CSI are carried on the PUSCH resource.

When a plurality of UL channels overlaps within a predetermined time interval, a method for the UE to process the UL channels needs to be specified in order to allow the BS to correctly receive the UL channel(s). Hereinafter, methods of handling collision between UL channels will be described.

Figure 9:
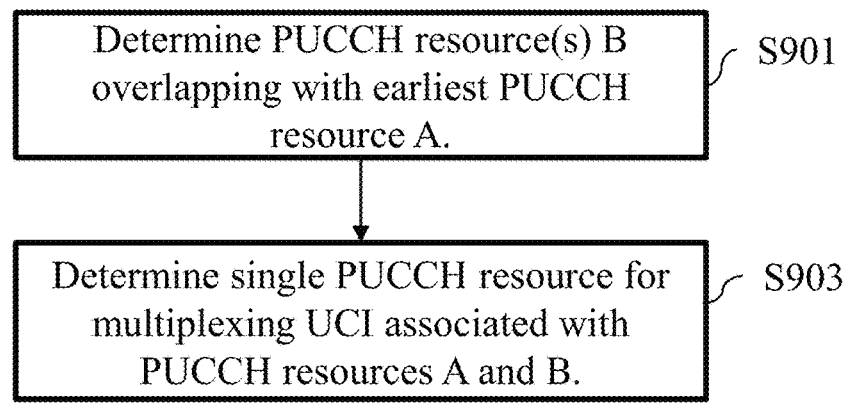
FIG. 9 illustrates an example of a process for a UE with overlapping PUCCHs in a single slot to handle collision between UL channels.

FIG. 9 illustrates an example of a process for a UE with overlapping PUCCHs in a single slot to handle collision between UL channels.

To transmit UCI, the UE may determine PUCCH resources for each UCI. Each PUCCH resource may be defined by a start symbol and a transmission interval. When PUCCH resources for PUCCH transmission overlap in a single slot, the UE may perform UCI multiplexing based on a PUCCH resource with the earliest start symbol. For example, the UE may determine overlapping PUCCH resource(s) (in time) (hereinafter, PUCCH resource(s) B) based on a PUCCH resource with the earliest start symbol (hereinafter, PUCCH resource A) in a slot (S901). The UE may apply a UCI multiplexing rule to the PUCCH resource A and the PUCCH resource(s) B. For example, based on UCI A of the PUCCH resource A and UCI B of the PUCCH resource(s) B, MUX UCI including all or part of the UCI A and the UCI B may be obtained according to the UCI multiplexing rule. To multiplex UCI associated with the PUCCH resource A and the PUCCH resource(s) B, the UE may determine a single PUCCH resource (hereinafter, MUX PUCCH resource) (S903). For example, the UE determines a PUCCH resource set corresponding to a payload size of the MUX UCI (hereinafter, PUCCH resource set X) among PUCCH resource sets configured or available for the UE and determines one of PUCCH resources belonging to the PUCCH resource set X as a MUX PUCCH resource. For example, the UE may determine one of the PUCCH resources belonging to the PUCCH resource set X as the MUX PUCCH resource, using a PUCCH resource indicator field in the last DCI among DCIs having a PDSCH-to-HARQ feedback timing indicator field that indicates the same slot for PUCCH transmission. The UE may determine the total number of PRBs of the MUX PUCCH resource based on the payload size of the MUX UCI and a maximum code rate for a PUCCH format of the MUX PUCCH resource. If the MUX PUCCH resource overlaps with other PUCCH resources (except for the PUCCH resource A and the PUCCH resource(s) B), the UE may perform the above-described operation again based on the MUX PUCCH resource (or a PUCCH resource having the earliest start symbol among the other PUCCH resources including the MUX PUCCH resource).

Figure 10:
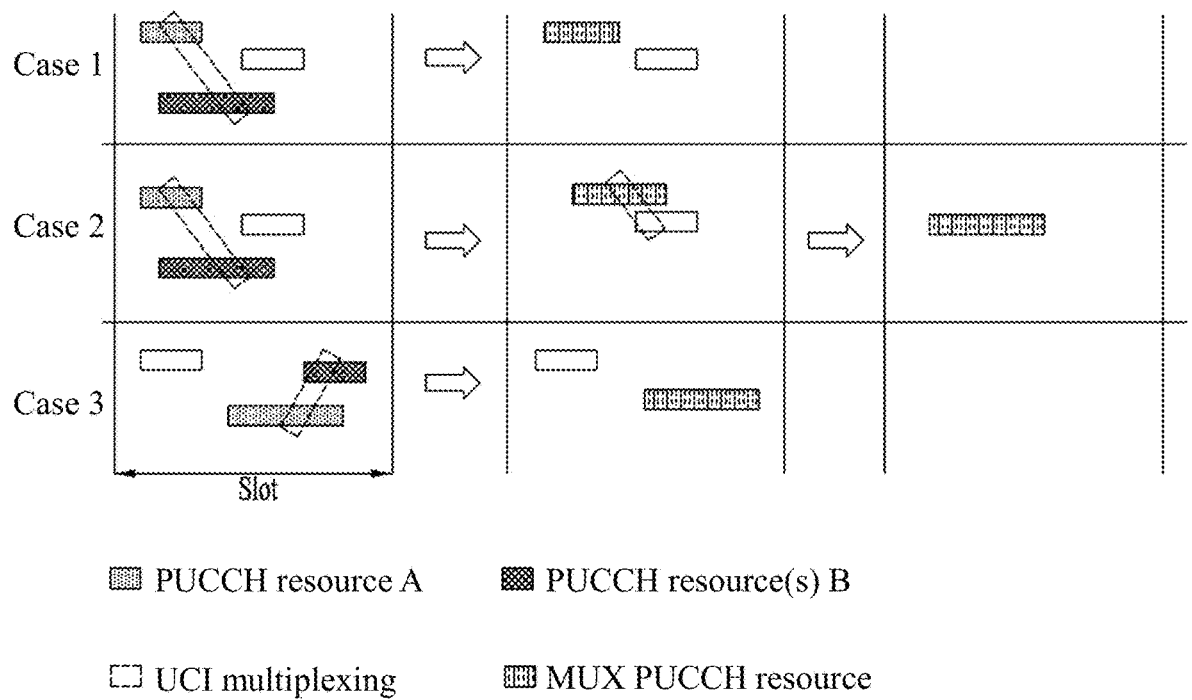
FIG. 10 illustrates cases for performing UCI multiplexing based on FIG. 9.

FIG. 10 illustrates cases for performing UCI multiplexing based on FIG. 9. Referring to FIG. 10, when a plurality of PUCCH resources overlap in a slot, UCI multiplexing may be performed based on the earliest PUCCH resource A (e.g., PUCCH resource A with the earliest start symbol). In FIG. 10, Case 1 and Case 2 show that the first PUCCH resource overlaps with another PUCCH resource. In this case, the process of FIG. 9 may be performed in a state in which the first PUCCH resource is regarded as the earliest PUCCH resource A. In contrast, Case 3 shows that the first PUCCH resource does not overlap with another PUCCH resource and the second PUCCH resource overlaps with another PUCCH resource. In Case 3, UCI multiplexing is not performed on the first PUCCH resource. Instead, the process of FIG. 9 may be performed in a state in which the second PUCCH resource is regarded as the earliest PUCCH resource A. Case 2 shows that a MUX PUCCH resource determined to transmit the multiplexed UCI newly overlaps with another PUCCH resource. In this case, the process of FIG. 9 may be additionally performed in a state in which the MUX PUCCH resource (or the earliest PUCCH resource (e.g., a PUCCH resource having the earliest start symbol) among the other PUCCH resources including the MUX PUCCH resource) is regarded as the earliest PUCCH resource A.

Figure 11:
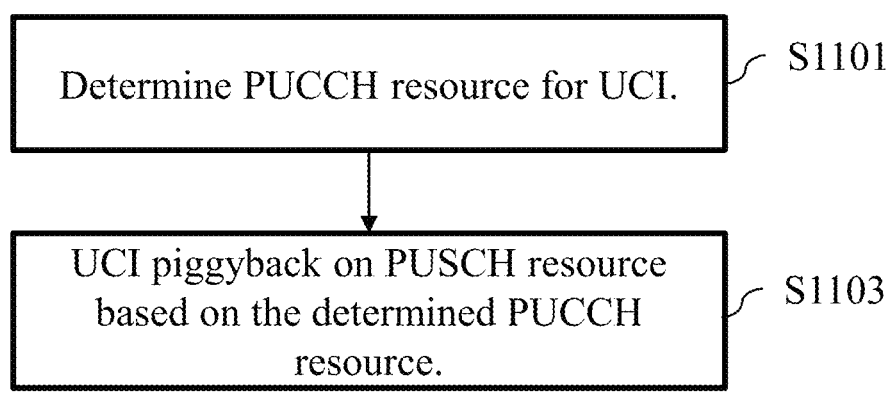
FIG. 11 illustrates a process for a UE with an overlapping PUCCH and PUSCH in a single slot to handle collision between UL channels.

FIG. 11 illustrates a process for a UE with an overlapping PUCCH and PUSCH in a single slot to handle collision between UL channels.

To transmit UCI, the UE may determine a PUCCH resource (S1101). Determination of the PUCCH resource for the UCI may include determining a MUX PUCCH resource. In other words, determination of the PUCCH resource for the UCI by the UE may include determining the MUX PUCCH resource based on a plurality of overlapping PUCCHs in a slot.

The UE may perform UCI piggyback on a PUSCH resource based on the determined (MUX) PUCCH resource (S1103). For example, when there is a PUSCH resource (on which multiplexed UCI transmission is allowed), the UE may apply the UCI multiplexing rule to PUCCH resource(s) overlapping with the PUSCH resource (on the time axis). The UE may transmit the UCI on the PUSCH.

When there is no PUSCH overlapping with the determined PUCCH resource in a slot, S1103 is omitted and the UCI may be transmitted on the PUCCH.

When the determined PUCCH resource overlaps with a plurality of PUSCHs on the time axis, the UE may multiplex the UCI with one of the PUSCHs. For example, when the UE intends to transmit the PUSCHs to respective serving cells, the UE may multiplex the UCI on a PUSCH of a specific serving cell (e.g., a serving cell having the smallest serving cell index) among the serving cells. When more than one PUSCH is present in the slot of the specific serving cell, the UE may multiplex the UCI on the earliest PUSCH transmitted in the slot.

Figure 12:
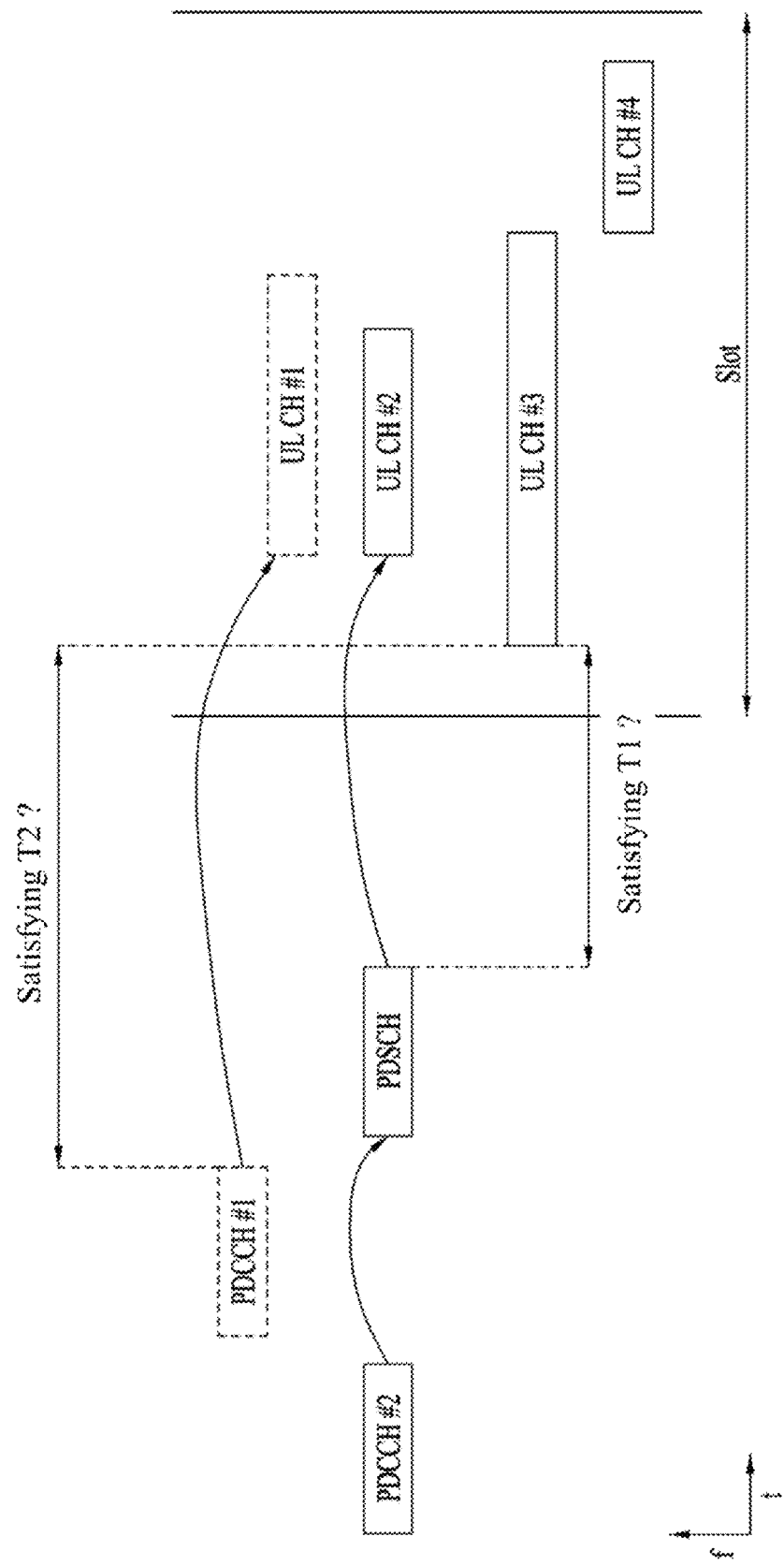
FIG. 12 illustrates UCI multiplexing considering a timeline condition.

FIG. 12 illustrates UCI multiplexing considering a timeline condition. When the UE performs UCI and/or data multiplexing for overlapping PUCCH(s) and/or PUSCH(s) on the time axis, the UE may be lacking in processing time for UCI and/or data multiplexing due to flexible UL timing configuration for the PUCCH or the PUSCH. In order to prevent the processing time of the UE from being insufficient, two timeline conditions (hereinafter, multiplexing timeline conditions) described below are considered in a process of performing UCI/data multiplexing for the overlapping PUCCH(s) and/or PUSCH(s) (on the time axis).

(1) The last symbol of a PDSCH corresponding to HARQ-ACK information is received before time T1 from the start symbol of the earliest channel among the overlapping PUCCH(s) and/or PUSCH(s) (on the time axis). T1 may be determined based on i) a minimum PDSCH processing time N1 defined according to a UE processing capability, and/or ii) $d_{1,1}$ predefined as an integer equal to or greater than 0 according to a position of scheduled symbol(s), PDSCH mapping type, BWP switching, etc.

For example, T1 may be determined as follows: $T1=(N1+d_{1,1})*(2048+144)*\kappa*2^{-\mu}*T_c$. N1 is based on u of Table 9 and Table 10 for UE processing capabilities #1 and #2, respectively, and μ is one of ($\mu_{PDCCH}$, $\mu_{PDSCH}$, $\mu_{UL}$), that causes the largest T1, where $\mu_{PDCCH}$ corresponds to a subcarrier spacing of a PDCCH for scheduling the PDSCH, $\mu_{PDSCH}$ corresponds to a subcarrier spacing of the scheduled PDSCH, $\mu_{UL}$ corresponds to a subcarrier spacing of a UL channel on which HARQ-ACK is to be transmitted, and $\kappa=T_s/T_f=64$. In Table 9, in the case of $N_{1,0}$, if a PDSCH DMRS position of an added DMRS is $l_1=12$, then $N_{1,0}=14$ and, otherwise, $N_{1,0}=13$ (refer to Section 7.4.1.1.2 of 3GPP TS 38.211). If the last symbol of the PDSCH for PDSCH mapping type A is present on an i-th slot, $d_{1,1}=7-i$ for i<7 and, otherwise, $d_{1,1}=0$. If the PDSCH has mapping type B for UE processing capability #1, $d_{1,1}$ may be 0 when the number of allocated PDSCH symbols is 7, $d_{1,1}$ may be 3 when the number of allocated PDSCH symbols is 4, $d_{1,1}$ may be 3+d when the number of allocated PDSCH symbols is 2, where d is the number of overlapping symbols of the scheduling PDCCH and the scheduled PDSCH. If the PDSCH mapping type is B for UE processing capability #2, $d_{1,1}$ may be 0 when the number of allocated PDSCH symbols is 7, and $d_{1,1}$ may correspond to the number of overlapping symbols of the scheduling PDCCH and the scheduled PDSCH when the number of allocated PDSCH symbols is 4. Further, if the number of allocated PDSCH symbols is 2, $d_{1,1}$ may be 3 when the scheduling PDSCH is within a 3-symbol CORESET and the CORESET and the PDSCH have the same starting symbol, and $d_{1,1}$ may be the number of overlapping symbols of the scheduling PDCCH and the scheduled PDSCH for the other cases. In the present disclosure T1 may also be referred to as T_proc,1.

(2) The last symbol of a (e.g., triggering) PDCCH for indicating PUCCH or PUSCH transmission is received before time T2 from the start symbol of the earliest channel among overlapping PUCCH(s) and/or PUSCH(s) (on the time axis). T2 may be determined based on i) a minimum PUSCH preparation time N1 defined according to a UE PUSCH timing capability, and/or ii) $d_{2,x}$ predefined as an integer equal to or greater than 0 according to the scheduled symbol position, BWP switching, etc. $d_{2,x}$ may be categorized into $d_{2,1}$ related to the position of scheduled symbol(s) and $d_{2,2}$ related to BWP switching.

For example, T2 may be determined as follows: T2=max{$(N2+d_{2,1})*(2048+144)*\kappa*2^{-u}*T_c+T_{ext}+T_{switch}, d_{2,2}$}. N2 is based on u of Table 11 and Table 12 for UE timing capabilities #1 and #2, respectively, and μ is one of ($\mu_{DL}$, $\mu_{UL}$), that causes the largest T1, where $\mu_{DL}$ corresponds to a subcarrier spacing of a PDCCH carrying DCI for scheduling a PUSCH, $\mu_{UL}$ corresponds to a subcarrier spacing of the PUSCH, and $\kappa=T_c/T_f=64$. If the first symbol of PUSCH allocation is composed only of a DMRS, then $d_{2,1}$ may be 0 and, otherwise, $d_{2,1}$ may be 1. If the scheduling DCI has triggered BWP switching, $d_{2,2}$ is equal to a switching time and, otherwise, $d_{2,2}$ is 0. The switching time may be differently defined depending on a frequency range (FR). For example, the switching time may be defined as 0.5 ms for FR1 and as 0.25 ms for FR2. In the present disclosure, T2 may also be referred to as T_proc,2.

Tables below show processing times according to UE processing capability. Particularly, Table 9 shows a PDSCH processing time for PDSCH processing capability #1 of the UE, Table 10 shows a PDSCH processing time for PDSCH processing capability #2 of the UE, Table 11 shows a PUSCH preparation time for PUSCH timing capability #1 of the UE, and Table 12 shows a PUSCH processing time for PUSCH timing capability #2 of the UE.

TABLE 9

| u/SCS | PDSCH decoding time N1 symbols | |
|---|---|---|
| | Front-loaded DMRS only | Front-loaded + additional DMRS |
| 0/15 kHz | 8 | $N_{1,0}$ |
| 1/30 kHz | 10 | 13 |
| 2/60 kHz | 17 | 20 |
| 3/120 kHz | 20 | 24 |

TABLE 10

| u/SCS | PDSCH decoding time N1 [symbols] |
|---|---|
| 0/15 kHz | 3 |
| 1/30 kHz | 4.5 |
| 2/60 kHz | 9 for frequency range 1 |

TABLE 11

| u/SCS | PUSCH preparation time N2 [symbols] |
|---|---|
| 0/15 kHz | 10 |
| 1/30 kHz | 12 |
| 2/60 kHz | 23 |
| 3/120 kHz | 36 |

TABLE 12

| u/SCS | PUSCH preparation time N2 [symbols] |
|---|---|
| 0/15 kHz | 5 |
| 1/30 kHz | 5.5 |
| 2/60 kHz | 11 for frequency range I |

The UE may report a PDSCH processing capability supported thereby with respect to carriers corresponding to one band entry within a band combination to the BS. For example, the UE may report a UE capability regarding whether the UE supports PDSCH processing capability #1 only or supports PDSCH processing capability #2, with respect to each SCS supported in a corresponding band. The UE may report a PUSCH processing capability supported thereby with respect to carriers corresponding to one band entry within a band combination. For example, the UE may report a UE capability regarding whether the UE supports PUSCH processing capability #1 only or supports PUSCH processing capability #2, with respect to each SCS supported in a corresponding band.

If the UE configured to multiplex different UCI types within one PUCCH intends to transmit a plurality of overlapping PUCCHs in a slot or transmit overlapping PUCCH(s) and PUSCH(s) in a slot, the UE may multiplex the UCI types when specific conditions are fulfilled. The specific conditions may include multiplexing timeline condition(s). For example, PUCCH(s) and PUSCH(s) to which UCI multiplexing is applied in FIGS. 9 to 11 may be UL channels that satisfy the multiplexing timeline condition(s). Referring to FIG. 12, the UE may need to transmit a plurality of UL channels (e.g., UL channels #1 to #4) in the same slot. Here, UL CH #1 may be a PUSCH scheduled by PDCCH #1. UL CH #2 may be a PUCCH for transmitting HARQ-ACK for a PDSCH. The PDSCH is scheduled by PDCCH #2 and a resource of UL CH #2 may also be indicated by PDCCH #2.

In this case, if overlapping UL channels (e.g., UL channels #1 to #3) on the time axis satisfy the multiplexing timeline condition, the UE may perform UCI multiplexing for overlapping UL channels #1 to #3 on the time axis. For example, the UE may check whether the first symbol of UL CH #3 from the last symbol of the PDSCH satisfies the condition of T1. The UE may also check whether the first symbol of UL CH #3 from the last symbol of PDCCH #1 satisfies the condition of T2. If the multiplexing timeline condition is satisfied, the UE may perform UCI multiplex for UL channels #1 to #3. In contrast, if the earliest UL channel (e.g., UL channel having the earliest start symbol) among overlapping UL channels does not satisfy the multiplexing timeline condition, the UE may not be allowed to multiplex all of the corresponding UCI types.

Figure 13:
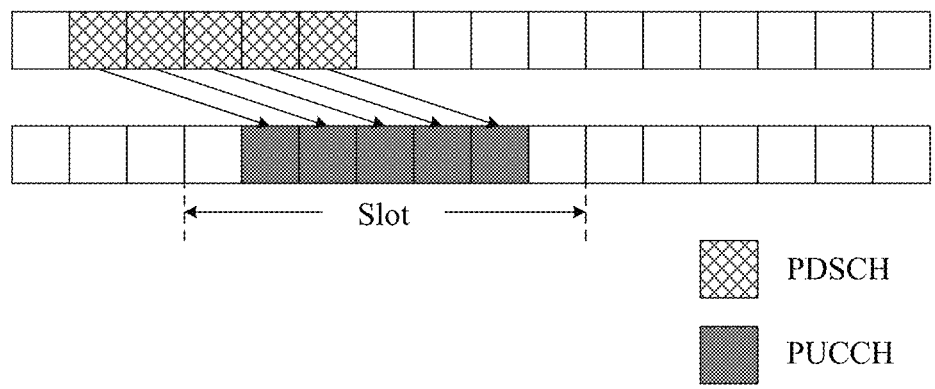
FIG. 13 illustrates transmission of a plurality of HARQ-ACK PUCCHs in a slot.

FIG. 13 illustrates transmission of a plurality of HARQ-ACK PUCCHs in a slot.

In some scenarios, it is regulated that a UE is not expected to transmit more than one PUCCH with HARQ-ACK information in a slot. Thus, according to these scenarios, the UE may transmit at most one PUCCH with HARQ-ACK information in one slot. In order to prevent a situation in which the UE fails to transmit the HARQ-ACK information due to restrictions on the number of HARQ-ACK PUCCHs transmittable by the UE, the BS needs to perform DL scheduling so that the HARQ-ACK information may be multiplexed on one PUCCH resource. However, when taking into consideration a service with stringent latency and reliability requirements, such as a URLLC service, a scheme of concentrating a plurality of HARQ-ACK feedbacks only on one PUCCH in a slot may not be desirable in terms of PUCCH performance. Furthermore, in order to support a latency-critical service, the BS may be required to schedule a plurality of consecutive PDSCHs with a short duration in one slot. Although the UE may transmit a PUCCH in random symbol(s) in a slot by the configuration/indication of the BS, if the UE is allowed to transmit only a maximum of one HARQ-ACK PUCCH in a slot, it may be impossible for the BS to perform fast back-to-back scheduling for PDSCHs and for the UE to perform fast HARQ-ACK feedback. Accordingly, in order to flexibly and efficiently use resources and support services, it is better to allow transmission of a plurality of (non-overlapping) HARQ-ACK PUCCHs (or PUSCHs) in one slot as illustrated in FIG. 13.

Hereinafter, methods of handing a plurality of UL transmissions (e.g., a plurality of UL channels) when the UL transmissions overlaps in time within a slot will be described. For example, the present disclosure provides implementations for avoiding a collision between UL transmissions with different priorities by canceling a lower priority UL transmission before the start of a higher priority UL transmission when the higher priority UL transmission and low priority UL transmission overlap in time, that is, when it is triggered, assigned, or configured that the higher priority UL transmission and low priority UL transmission overlap in time.

Figure 14:
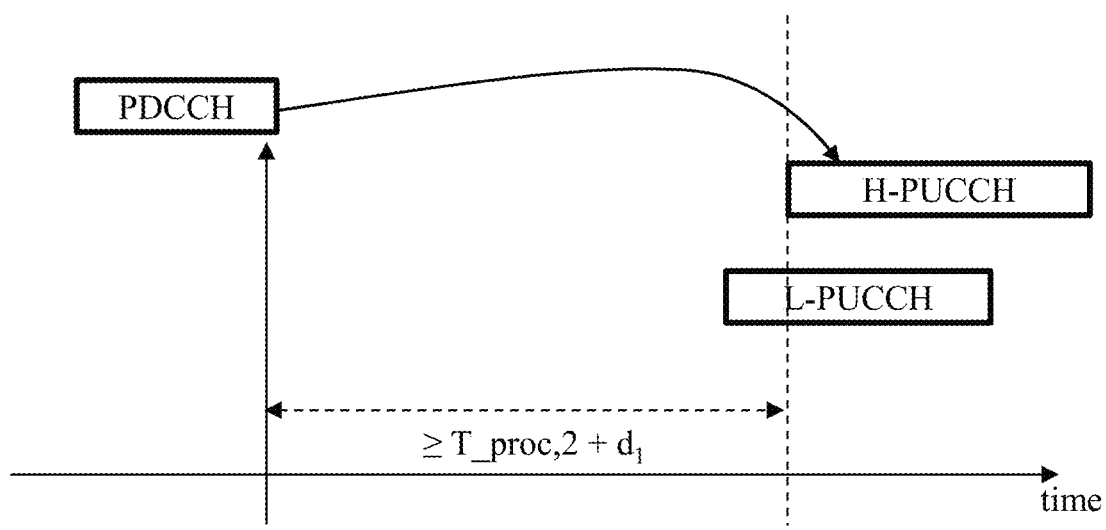
FIG. 14 illustrates a collision situation between PUCCHs with different priorities.
Figure 15:
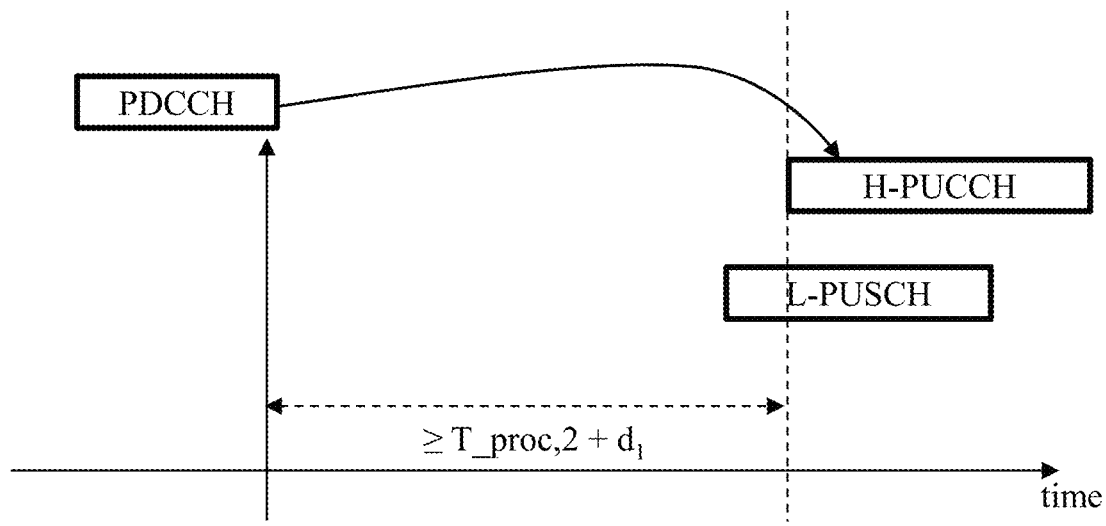
FIGS. 15 and 16 illustrate collision situations between a PUSCH and a PUCCH with different priorities.
Figure 16:
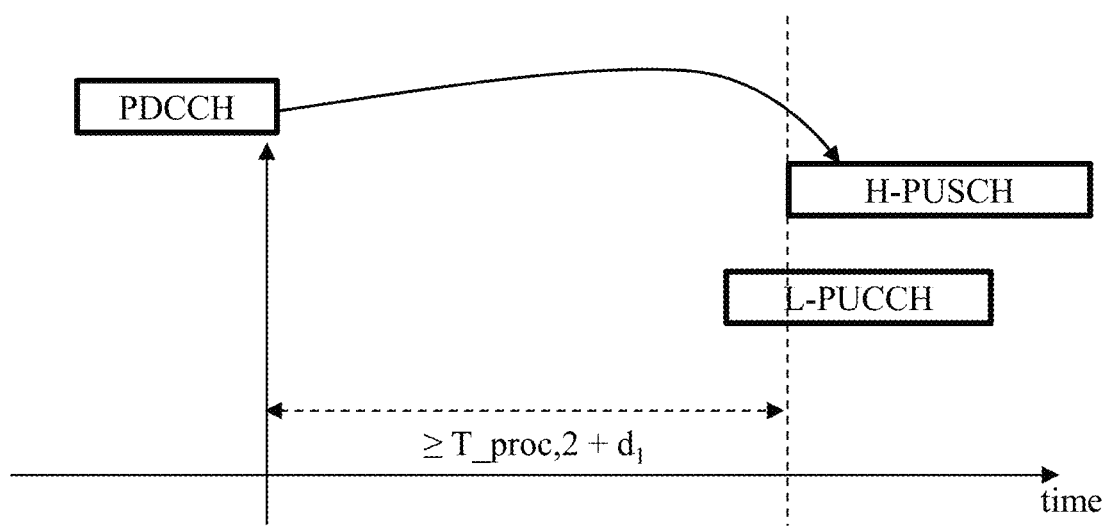

FIG. 14 illustrates a collision situation between PUCCHs with different priorities, and FIGS. 15 and 16 illustrate collision situations between a PUSCH and a PUCCH with different priorities. Referring to FIG. 14, when a higher priority H-PUCCH scheduled (i.e., triggered) by a DCI format in PDCCH reception overlaps in time with a lower priority L-PUCCH, the UE may cancel transmission of the L-PUCCH before the first symbol overlapping with the H-PUCCH. In this case, depending on UE implementations, transmission of the entire L-PUCCH may be canceled, or transmission of a portion of the L-PUCCH that overlaps with the H-PUCCH may be canceled. Consequently, transmission of at least the portion of the L-PUCCH overlapping with the H-PUCCH may be canceled.

Referring to FIG. 15, when a higher priority H-PUCCH scheduled (i.e., triggered) by a DCI format in PDCCH reception overlaps in time with a lower priority L-PUSCH, the UE may cancel transmission of the L-PUSCH before the first symbol overlapping with the H-PUCCH. Depending on UE implementations, transmission of the entire L-PUSCH may be canceled, or transmission of a portion of the L-PUSCH overlapping with the H-PUCCH may be canceled. Consequently, transmission of at least the portion of the L-PUSCH overlapping with the H-PUCCH may be canceled.

Referring to FIG. 16, when a higher priority H-PUSCH scheduled by a DCI format in PDCCH reception overlaps in time with a lower priority L-PUCCH, the UE may cancel transmission of the L-PUCCH before the first symbol overlapping with the H-PUSCH. Depending on UE implementations, transmission of the entire L-PUCCH may be canceled, or transmission of a portion of the L-PUCCH overlapping with the H-PUSCH may be canceled. Consequently, transmission of at least the portion of the L-PUCCH overlapping with the H-PUSCH may be canceled.

In FIGS. 14 to 16, the UE may expect that transmission of the H-PUCCH or H-PUSCH will not start before $T\_proc,2+d_1$ from the last symbol of the PDCCH reception, where $T\_proc,2$ is a PUSCH preparation time for a corresponding UE processing capability on the assumption of $d_{2,1}$ based on u and $N_2$, and $d_1$ is determined by a reported UE capability. For example, the value of a parameter push-PreparationLowPriority reported by the UE to the BS may be used as $d_1$.

Specifically, referring to 3GPP TS 38.213 V16.2.0, when the UE is scheduled by a DCI format in a first PDCCH to transmit a first PUCCH or first PUSCH with a higher priority, which overlaps with a second PUCCH or second PUSCH with a lower priority scheduled by a DCI format in a second PDCCH, >$T\_proc,2$ may be based on the value of u corresponding to the smallest SCS configuration among the first PDCCH, the second PDCCHs, the first PUCCH or the first PUSCH, and the second PUCCHs or the second PUSCHs.

>>If the overlapping group includes the first PUCCH,

>>>If a parameter processingType2Enabled in an RRC configuration PDSCH-ServingCellConfig, which is used to configure common UE-specific PDSCH parameters over BWPs of UEs in one serving cell, is set to be enabled for the serving cell where the UE receives the first PDCCH and for all serving cells where the UE receives PDSCHs corresponding to the second PUCCHs, and if processingType2Enabled of PDSCH-ServingCellConfig is set to be enabled for serving cells with the second PUSCHs, $N_2$ may be 5 for u=0, 5.5 for u=1, and 11 for u=2.

>>>Else, $N_2$ may be 10 for u=0, 12 for u=1, 23 for u=2, and 36 for u=3.

>If the overlapping group includes the first PUSCH,

>>If processingType2Enabled of PDSCH-ServingCellConfig is set to be enabled for serving cells with the first PUSCH and the second PUSCHs, and if processingType2Enabled of PDSCH-ServingCellConfig is set to be enabled for all serving cells where the UE receives PDSCHs corresponding to the second PDCCHs, $N_2$ may be 5 for u=0, 5.5 for u=1, and 11 for u=2.

>>>Else, $N_2$ may be 10 for u=0, 12 for u=1, 23 for u=2, and 36 for u=3.

The parameter processingType2Enabled may be used to enable the configuration of an advanced processing time capability for a PDSCH.

When a collision occurs between PUCCHs with different priorities or between a PUCCH and a PUSCH with different priorities, the conventional 3GPP-based communication system may guarantee the UE processing time based on an extended scheduling timeline and enable a lower priority UL transmission to be canceled before a higher priority UL transmission as illustrated in FIGS. 14 to 16. In other words, in the conventional 3GPP-based communication system, the UE needs to cancel transmission of an L-PUCCH or L-PUSCH at the latest before the first symbol overlapping with an H-PUCCH, where the L-PUCCH or L-PUSCH overlaps in time with the H-PUCCH starting after at least $T\_proc,1+d_1$ from the last symbol of a PDCCH. In addition, the UE needs to cancel transmission of an L-PUCCH at the latest before the first symbol overlapping with an H-PUSCH, where the L-PUCCH overlaps in time with the corresponding H-PUSCH starting after at least $T\_proc,1+d_1$ from the last symbol of the PDCCH. FIGS. 14 to 16 illustrate cases in which transmission of a lower priority UL channel is triggered/scheduled to start before transmission of a higher priority UL channel. However, for an L-PUSCH/L-PUCCH that overlaps with a higher priority UL channel satisfying the time condition of $T\_proc,1+d_1$ and is scheduled/triggered to start later than the higher priority UL channel, the UE may cancel transmission of the L-PUSCH/L-PUCCH before the first overlapping symbol. When the lower priority UL channel is scheduled/triggered to start later than the higher priority UL channel, the UE may cancel transmission of the entire L-PUSCH/L-PUCCH because the L-PUSCH/L-PUCCH overlaps with the higher priority UL channel from the start symbol of the L-PUSCH/L-PUCCH.

For collisions between PUSCHs with different priorities, the conventional 3GPP-based communication system considers only a collision between configured grant PUSCHs, which are semi-statically configured so that it is difficult for the BS to avoid the collision based on scheduling. That is, the conventional 3GPP-based communication system does not consider a collision between different types of PUSCHs with different priorities (e.g., an overlap in time between a configured grant-based PUSCH and a dynamic grant-based PUSCH having different priorities or an overlap in time between dynamic grant-based PUSCHs having different priorities). Since PUSCH transmission is based on a transport block (TB) provided by a medium access (MAC) layer, not only physical layer operations but also MAC layer operations need to be considered to cancel transmission of some PUSCHs among overlapping PUSCHs. It has been regulated that the UE shall not expect an overlap in time between PUSCHs with different priorities, and thus, the BS has been expected to schedule the PUSCHs with different priorities not to overlap in time with each other. However, if the BS configures a plurality of configured grant (CG) PUSCHs, it may be difficult for the BS to schedule a PDCCH-based PUSCH (i.e., dynamic grant based PUSCH) not to overlap with the CG PUSCHs because the CG PUSCHs are expected to occupy a significant amount of resources. In some cases, the BS may desire to dynamically schedule another PUSCH (hereinafter referred to as a second PUSCH) in a state that the BS schedules a dynamic grant (DG) based PUSCH (hereinafter referred to as a first PUSCH) to the UE. However, according to the conventional 3GPP-based wireless system, the BS has a constraint that the second PUSCH needs to be scheduled in such a way that the second PUSCH does not overlap in time with the first PUSCH. Recently, to enable the BS to freely schedule PUSCHs, it is considered that the BS is allowed to schedule the PUSCHs such that a CG-based PUSCH and a DG-based PUSCH with different priorities overlap in time or DG-based PUSCHs with different priorities overlap in time.

Hereinafter, methods of handling collisions between UL channels when there is a collision between PUSCHs with different priorities, that is, when the PUSCHs with different priorities are scheduled to overlap in time with each other will be described.

If a collision occurs between PUSCHs with different priorities, the UE needs to cancel transmission of a PUSCH which is ongoing or in preparation, and prepare for transmission of a new PUSCH. The new PUSCH transmission may be used to transmit traffic such as a URLLC service with a higher priority, and the UE may need to transmit the new PUSCH almost within the minimum processing time. However, if part of a PUSCH pipeline is in use for the previous PUSCH transmission, the UE may require an additional time to cancel the previous PUSCH and use the PUSCH pipeline again to match the new PUSCH, so that the UE may require a longer processing time than the existing processing time for PUSCH transmission.

In addition, to protect lower priority UCI with relatively high importance, it is being considered to transmit the lower priority UCI over a higher priority PUSCH. The corresponding UCI may correspond to UCI multiplexed with a PUSCH to be canceled. In this case, the UE may require an additional time to include UCIs with different priorities in a PUSCH.

Hereinafter, implementations in which the scheduling time of higher priority PUSCH transmission guarantees a sufficient time to cancel other lower priority UL transmissions as well as minimizes a time delay in URLLC transmission when the higher priority PUSCH transmission cancels the other lower priority UL transmissions will be described. In particular, implementations of using a different cancellation timeline depending on the type of lower priority (LP) UL transmission cancelled by the higher priority (HP) PUSCH transmission and handling the LP PUCCH/PUSCH cancelled based on the cancellation timeline will be described.

UE Side

First, the implementations of the present disclosure will be described from the perspective of the UE.

Figure 17:
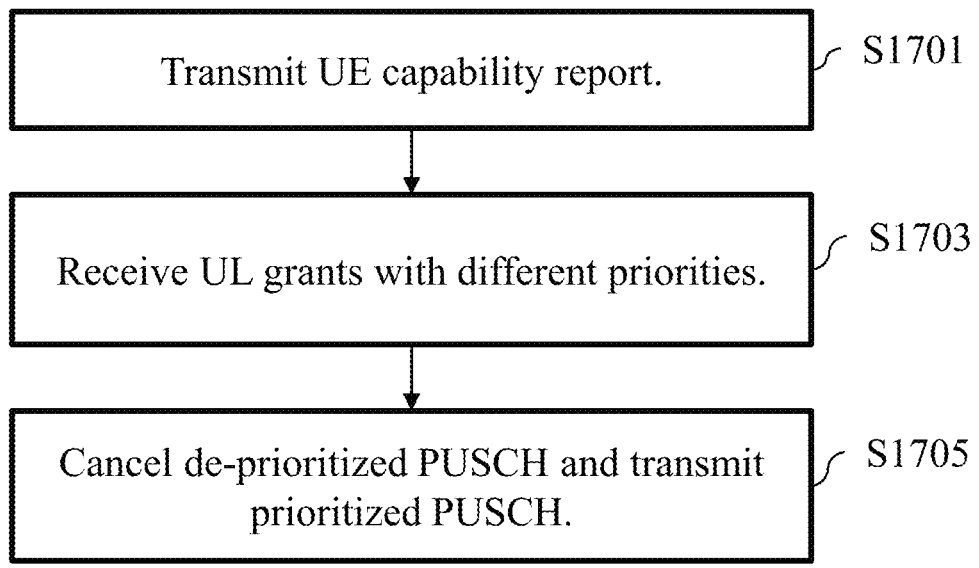
FIG. 17 illustrates a flow of UL channel transmission at a UE according to some implementations of the present disclosure.

FIG. 17 illustrates a flow of UL channel transmission at the UE according to some implementations of the present disclosure.

The UE may be configured with higher layer parameter(s) required to transmit a PUCCH and/or PUSCH for each priority. If PUCCH(s) and/or PUSCH(s) with different priorities overlap in time, the UE may apply cancellation timeline(s) to be described in some implementations of the present disclosure. In some implementations of the present disclosure, when UL channels collide with each other (i.e., when UL channels overlap at least in time with each other), the UE may multiplex LP UCI included in an LP PUCCH/PUSCH onto an HP PUSCH/PUCCH based on satisfied cancellation timeline(s) among cancellation timelines (i.e., cancellation time conditions).

In some implementations of the present disclosure, the UE may operate as follows.

The UE may establish an RRC connection with the BS and transmit a UE capability report to the BS (S1701). The UE may receive UL grants with different priorities (S1703). The UE may perform multiplexing and/or prioritization between multiple UL grants based on the transmitted UE capability report according to some implementations of the present disclosure. The UE may cancel transmission of a non-prioritized PUCCH and/or PUSCH and transmit a prioritized PUSCH (S1705). In this case, UCI in the non-prioritized PUCCH and/or PUSCH may be transmitted over the prioritized PUSCH depending on satisfied timelines.

The following implementations may be considered in the operations of the UE of the present disclosure, <Implementation A1> Additional UL Cancellation/Preparation Time Offset for PUSCH Prioritization In the prioritization, a case in which a PUCCH collides with a PUSCH and a case in which a PUSCH collides with another PUSCH may be treated differently. When two UL channels with different priorities overlap each other, when the UE selects and transmits one UL channel among the two UL channels, and when the two UL channels are both PUSCHs, the UE may assume a longer PUSCH preparation time or a longer scheduling time (than when PUCCHs with different priorities overlap in time or when a PUCCH and a PUSCH with different priorities overlap in time) in order to determine the validity of scheduling (e.g., to determine whether an HP PUSCH is validly scheduled).

In the conventional 3GPP-based wireless communication system, a process in which the UE transmits a PUCCH, particularly, a HARQ-ACK PUCCH may include a process in which the UE receives and processes a PDSCH and transmits the processing result over the PUCCH at a physical (PHY) layer. On the other hand, a PUSCH transmission process may include a process in which after reception of a UL grant over a PDCCH, a MAC layer generates a TB suitable for a PUSCH resource from higher layer information (MAC SDU) and transmits the TB to the PHY layer. When each channel is canceled, different processing may be required. When the PUCCH is canceled, it may not be necessary to cancel PDSCH decoding and HARQ combining, and thus a process in which the PHY layer converts HARQ-ACK information into a bit sequence and transmit the bit sequence may need to be cancelled. On the other hand, for the PUSCH, the PUSCH for which a MAC PDU has been generated from a MAC SDU is cancelled. Thus, if only transmission of a PHY channel is canceled without canceling the PUSCH, it may be difficult to transmit the generated MAC PDU unless there is special assistance from the BS, and there may be a large delay due to waiting until RLC reordering. To avoid such adverse effects, a MAC layer process for revoking the MAC PDU generation process may be necessary, which may require additional inter-layer operation. In Implementation A1, an additional processing time offset, $d_3$ is used to reflect the characteristics of such a canceled UL channel.

In this case, $d_3$ may be included and transmitted in capability signaling for informing the BS of capabilities supported by the UE. The value of $d_3$ may be transmitted by an RRC parameter, and one value may be selected from a predetermined range. For example, one of the values {0, 1, 2} may be selected.

Alternatively, to determine the value of $d_3$, the type of colliding radio resource (e.g., PUSCH or PUCCH), in particular, the type of radio resource to be canceled may be considered as described above. For example, when a PUCCH is canceled, $d_3=0$, or $d_3$ may not be applied. When a PUSCH is canceled, $d_3$ may be selected as a value reported by the UE through the capability signaling among the values of 0, 1, and 2. Alternatively, it may be reported by a separate RRC parameter as a separate capability that the value of $d_3$ applied when the PUCCH is canceled may be different from the value of $d_3$ applied when the PUSCH is canceled.

Alternatively, it may be considered that the value of $d_3$ dynamically changes depending on the colliding resource. For example, $d_3$ may have different values depending on whether the number of channels involved in a collision between UL channels is more than or equal to N or less than or equal to N. As another example, $d_3$ may have different values depending on whether the time length of a channel to be canceled is more than or equal to L symbols or less than or equal to L symbols. As a further example, $d_3$ may have different values depending on whether another UL channel overlapping in time with a canceled channel is scheduled. For example, when there is another PUCCH resource overlapping in time with a canceled PUSCH resource, and when PUCCH transmission is capable of being performed by performing UCI multiplexing on the corresponding PUSCH resource if the PUSCH resource is canceled, $d_3$ may have a larger value. In this case, the number of channels N, the channel length L, and the value of $d_3$ to be used in each case may be predefined or determined by L1 signaling and/or higher layer signaling of the BS.

For example, when the UE supports prioritization between two PUSCHs having different priorities, the UE may report the additional processing time $d_3$ to the BS through the capability signaling, that is, capability reporting. When the UE performs the prioritization between the two PUSCHs having different priorities, the UE may expect only a case in which the distance from the end of a PDCCH scheduling a PUSCH having a larger (i.e., higher) priority to the start of the corresponding PUSCH is more than or equal to T_proc,2+$d_1$+$d_3$ or T'_proc,2+$d_1$. In other words, it may be regulated that the UE does not expect that an HP PUSCH overlapping in time with an LP PUSCH starts before the time T_proc,2+$d_1$+$d_3$ elapses from the last symbol of a PDCCH scheduling transmission of the HP PUSCH.

Alternatively, for time delay reduction, when the UE performs prioritization between two PUSCHs having different priorities, the UE may expect only a case in which the distance from the end of a PDCCH scheduling a PUSCH with a larger (i.e., higher) priority to the start of the first symbol among symbols where the PUSCH with the higher priority overlaps with a PUSCH with a smaller (i.e., lower) priority is more than or equal to T_proc,2+$d_1$+$d_3$ or T'_proc, 2+$d_1$. In other words, it may be regulated that the UE does not expect that the first symbol where an LP PUSCH and an HP PUSCH overlap starts before the time T_proc,2+$d_1$+$d_3$ elapses from the last symbol of a PDCCH scheduling transmission of the HP PUSCH. This may guarantee the distance from the PDCCH scheduling the HP PUSCH to a time point at which cancellation is actually required, thereby reducing a delay in higher priority scheduling.

The following may be considered in Implementation A1.

T_proc,2=max{(N2+$d_{2,1}$+$d_2$)(2048+144)*κ*$2^{-u}$*$T_c$+$T_{ext}$+$T_{switch}$, $d_{2,2}$}}

T'_proc,2=max{(N2+$d_{2,1}$+$d_2$+$d_3$)(2048+144)*κ*$2^{-u}$*$T_c$+$T_{ext}$+$T_{switch}$, $d_{2,2}$}}

T_proc,2 and T'_proc,2 are PUSCH preparation times for corresponding UE processing capabilities.

Assuming $d_{2,1}$=0, other parameters (e.g., $T_{ext}$, $T_{switch}$, $d_{2,2}$, etc.) except for N2 and $d_3$ are defined in Section 6.4 of 3GPP TS 38.214 V16.2.0.

$d_1$ may be determined by a reported UE capability.

N2 may be determined as described in 3GPP TS 38.214 V16.2.0 (see N2 in 3GPP TS 38.214 V16.2.0).

<Implementation A2> Additional UL Cancellation/Preparation Timeline for PUSCH Multiplexing When the UE selects and transmits one of two UL channels overlapping (in time) with each other and having different priorities, the UE may determine the validity of H-PUSCH scheduling based on two PUSCH preparation times or scheduling times by considering an additional preparation time or scheduling time.

The additional preparation time or scheduling time may be defined in the form of an offset represented by the number of symbols, which may be predetermined or determined by L1 signaling or higher layer signaling between the UE and BS. The UE may determine the validity of scheduling using the offset based on each of conventional timeline X and additional timeline Y.

For example, when the UE supports prioritization between two PUSCHs/PUCCHs having different priorities (i.e., between a PUSCH and a PUCCH having different priorities, between PUSCHs having different priorities, or between PUCCHs having different priorities), the UE may report an additional processing time $d_{priority}$ through capability signaling. When the UE performs prioritization between PUSCH(s)/PUCCH(s) having different priorities, if the distance between the start of a PUSCH/PUCCH having a larger (i.e., higher) priority and the end of a PDCCH scheduling the corresponding PUSCH/PUCCH or related PDSCH is more than or equal to T_proc,2+$d_1$, the UE may determine that timeline X is satisfied. If the distance is more than or equal to T_proc,2+$d_1$+$d_{priority}$ or T'_proc,2+$d_1$, the UE may determine that additional timeline Y is satisfied.

The following may be considered in Implementation A2.

T_proc,2=max{(N2+$d_{2,1}$+$d_2$)(2048+144)*κ*$2^{-u}$*$T_c$+$T_{ext}$+$T_{switch}$, $d_{2,2}$}}

T'_proc,2=max{(N2+$d_{2,1}$+$d_2$+$d_{priority}$)(2048+144)*κ*$2^{-u}$*$T_c$+$T_{ext}$+$T_{switch}$, $d_{2,2}$}}

T_proc,2 and T'_proc,2 are PUSCH preparation times for corresponding UE processing capabilities.

Assuming $d_{2,1}=0$, other parameters (e.g., $T_{ext}$, $T_{swtich}$, $d_{2,2}$, etc.) except for N2 and $d_{priority}$ are defined in Section 6.4 of 3GPP TS 38.214 V16.2.0.

$d_1$ may be determined by a reported UE capability.

N2 may be determined as described in 3GPP TS 38.214 V16.2.0 (see N2 in 3GPP TS 38.214 V16.2.0).

In some implementations of the present disclosure, the UE may perform the following operations in consideration of timeline X and timeline Y.

Implementation A2-1

If two overlapping UL transmissions with different priorities satisfy timeline X but do not satisfy timeline Y, the UE may cancel transmission of a PUSCH or PUCCH with a smaller (i.e., lower) priority at least from the first symbol overlapping with a PUSCH or PUCCH with a larger (i.e., higher) priority among symbols of the PUSCH or PUCCH having the lower priority, and the BS may expect that the UE will operate as described above.

Implementation A2-2

If two overlapping UL transmissions with different priorities satisfy both timeline X and timeline Y, and if a UL channel with a smaller (lower) priority is a PUCCH or PUSCH including UCI, the UE may multiplex and transmit the UCI included in the PUSCH or PUCCH having the smaller (lower) priority over a PUSCH or PUCCH having a larger (higher) priority, and the BS may expect that the UE will operate as described above.

In Implementation A2-2, timeline Y may be a time condition for enabling inter-priority multiplexing. That is, Implementation A2-2 may enable inter-priority UL multiplexing on a limited basis when a UL transmission with a larger (higher) priority is scheduled with a sufficient time, thereby preventing a problem that may occur when an LP PUSCH/PUCCH is canceled.

Implementation A3

If the UE receives a PDCCH that satisfies specific conditions after cancelling a PUSCH/PUCCH, the UE may transmit the payload of the canceled PUSCH or PUCCH on a resource indicated by the corresponding PDCCH or a resource having the same intra-slot (or intra-subslot) position as the previously canceled PUSCH or PUCCH within a slot (or a subslot consisting of fewer than 14 symbols (e.g., 2 or 7 symbols)) indicated by the corresponding PDCCH. If a PUCCH is canceled and if PUSCH scheduling satisfies the specific conditions, the UE may transmit UCI supposed to be transmitted on the canceled PUCCH over a PUSCH. If a PUSCH is canceled and if PUSCH scheduling satisfies the specific conditions, the UE may retransmit only a canceled portion of the PUSCH. For example, referring to FIG. 15, if the L-PUSCH transmission starts but is canceled before the H-PUSCH transmission starts, only a portion of the L-PUSCH canceled due to the start of the H-PUSCH may be retransmitted except for a portion transmitted before the L-PUSCH is canceled.

When a legacy UE or a UE using Implementation A2-1 performs prioritization between UL transmissions, the UE may cancel all or part of an LP PUSCH/PUCCH. According to Implementation A3, the UE may directly transmit UCI included in the canceled transmission to the BS through another transmission. In particular, when a PUSCH/PUCCH including HARQ-ACK feedback is canceled, the BS may receive the HARQ-ACK feedback again, that is, receive the result of receiving a PDSCH associated with the canceled HARQ-ACK feedback, without scheduling retransmission of the associated PDSCH.

In Implementation A3, the following may be considered as the specific conditions.

The corresponding PDCCH is a PDCCH received first after symbols where transmission with a smaller (lower) priority is cancelled.

Specific field values of scheduling DCI match predetermined field values. For example, a type 1 resource allocation field in the scheduling DCI carried on the corresponding PDCCH is 0 and the value of an MCS is 31 (see 3GPP TS 38.212).

An RNTI for identifying a PDCCH that satisfies a specific condition is preconfigured, and the CRC of the corresponding PDCCH is scrambled with the corresponding RNTI. In this case, the corresponding PDCCH may be a group-common PDCCH. If the UE cancels transmission of a PUCCH/PUSCH, the UE may transmit the canceled PUCCH/PUSCH at a slot, which is determined by applying a predetermined or indicated slot or subslot offset to the time of receiving a PDCCH scheduling the canceled PUCCH/PUSCH, in the same way as that for the previously canceled transmission. For example, retransmission of the canceled PUCCH/PUSCH may be performed based on the same parameters (e.g., start symbol, the number of symbols, DM-RS location, antenna port, etc.) as the previously canceled transmission, except for the slot position for transmission.

BS Side

The above implementations of the present disclosure will be described again from the perspective of the BS.

Figure 18:
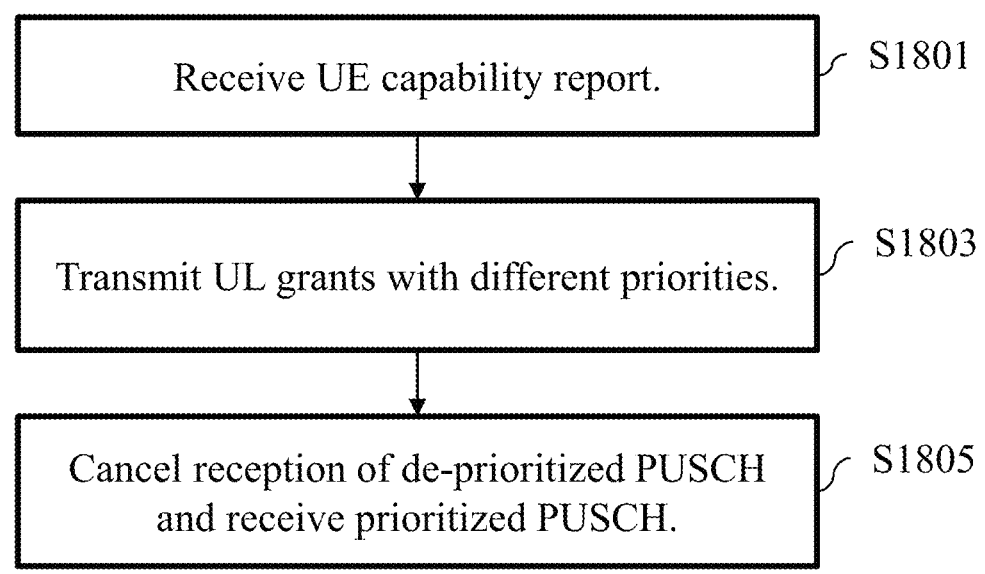
FIG. 18 illustrates a flow of UL channel reception at a BS according to some implementations of the present disclosure.

FIG. 18 illustrates a flow of UL channel reception at the BS according to some implementations of the present disclosure.

The BS may be configured with higher layer parameter(s) required to transmit a PUCCH and/or PUSCH for each priority. If PUCCH(s) and/or PUSCH(s) with different priorities for the UE overlap in time, the BS may expect that the UE may apply cancellation timeline(s) described above in some implementations of the present disclosure. In some implementations of the present disclosure, when the UE has a collision between UL channels (i.e., when UL channels overlap at least in time with each other), the BS may expect that the UE may multiplex LP UCI included in an LP PUCCH/PUSCH to an HP PUSCH/PUCCH based on satisfied cancellation timeline(s) among cancellation timelines (i.e., cancellation time conditions).

In some implementations of the present disclosure, the BS may operate as follows.

The BS may establish an RRC connection with the UE and receive a UE capability report from the UE (S1801). The BS may transmit UL grants for a plurality of PUSCHs having different priorities to the UE in consideration of the capability of the UE (S1803). The BS may assume that the UE performs multiplexing and/or prioritization between multiple UL grants according to some implementations of the present disclosure and then receive a PUSCH prioritized by the UE according to the result of the multiplexing and/or prioritization (S1805). The BS may assume that UCI in a non-prioritized PUCCH and/or PUSCH is transmitted on the prioritized PUSCH according to the capability of the UE and then perform decoding of the PUSCH. The UCI in the non-prioritized PUCCH and/or PUSCH may be transmitted over the prioritized PUSCH.

The following implementations may be considered in the operations of the BS of the present disclosure, <Implementation B1> Additional UL Cancellation/Preparation Time Offset for PUSCH Prioritization In the prioritization, a case in which a PUCCH collides with a PUSCH and a case in which a PUSCH collides with another PUSCH may be treated differently. When two UL channels with different priorities overlap each other, when the UE selects and transmits one UL channel among the two UL channels, and when the two UL channels are both PUSCHs, the BS may assume that the UE uses a longer PUSCH preparation time or a longer scheduling time (than when PUCCHs with different priorities overlap in time or when a PUCCH and a PUSCH with different priorities overlap in time) in order to determine the validity of scheduling (e.g., to determine whether an HP PUSCH is validly scheduled).

In the conventional 3GPP-based wireless communication system, a process in which the UE transmits a PUCCH, particularly, a HARQ-ACK PUCCH may include a process in which the UE receives and processes a PDSCH and transmits the processing result over the PUCCH at a PHY layer. On the other hand, a PUSCH transmission process may include a process in which after reception of a UL grant over a PDCCH, a MAC layer generates a TB suitable for a PUSCH resource from higher layer information (MAC SDU) and transmits the TB to the PHY layer. When each channel is canceled, different processing may be required. When the PUCCH is canceled, it may not be necessary to cancel PDSCH decoding and HARQ combining, and thus a process in which the PHY layer converts HARQ-ACK information into a bit sequence and transmit the bit sequence may need to be cancelled. On the other hand, for the PUSCH, the PUSCH for which a MAC PDU has been generated from a MAC SDU is cancelled. Thus, if only transmission of a PHY channel is canceled without canceling the PUSCH, it may be difficult to transmit the generated MAC PDU unless there is special assistance from the BS, and there may be a large delay due to waiting until RLC reordering. To avoid such adverse effects, a MAC layer process for revoking the MAC PDU generation process may be necessary, which may require additional inter-layer operation. In Implementation B1, an additional processing time offset, $d_3$ is used to reflect the characteristics of such a canceled UL channel.

In this case, $d_3$ may be included and transmitted in capability signaling for informing the BS of capabilities supported by the UE. The value of $d_3$ may be transmitted by an RRC parameter, and one value may be selected from a predetermined range. For example, one of the values {0, 1, 2} may be selected.

Alternatively, to determine the value of $d_3$, the type of colliding radio resource (e.g., PUSCH or PUCCH), in particular, the type of radio resource to be canceled may be considered as described above. For example, when a PUCCH is canceled, $d_3=0$, or $d_3$ may not be applied. When a PUSCH is canceled, $d_3$ may be selected as a value reported by the UE through the capability signaling among the values of 0, 1, and 2. Alternatively, it may be reported by a separate RRC parameter as a separate capability that the value of $d_3$ applied when the PUCCH is canceled may be different from the value of $d_3$ applied when the PUSCH is canceled.

Alternatively, it may be considered that the value of $d_3$ dynamically changes depending on the colliding resource. For example, $d_3$ may have different values depending on whether the number of channels involved in a collision between UL channels is more than or equal to N or less than or equal to N. As another example, $d_3$ may have different values depending on whether the time length of a channel to be canceled is more than or equal to L symbols or less than or equal to L symbols. As a further example, $d_3$ may have different values depending on whether or not another UL channel overlapping in time with a canceled channel is scheduled. For example, when there is another PUCCH resource overlapping in time with a canceled PUSCH resource, and when PUCCH transmission is capable of being performed by performing UCI multiplexing on the corresponding PUSCH resource if the PUSCH resource is canceled, $d_3$ may have a larger value. In this case, the number of channels N, the channel length L, and the value of $d_3$ to be used in each case may be predefined or determined by L1 signaling and/or higher layer signaling of the BS.

For example, when the UE supports prioritization between two PUSCHs having different priorities, the UE may report the additional processing time $d_3$ to the BS through the capability signaling, that is, capability reporting. When the UE performs the prioritization between the two PUSCHs having different priorities, the BS may perform scheduling by assuming that the UE expects only a case in which the distance from the end of a PDCCH scheduling a PUSCH having a larger (i.e., higher) priority to the start of the corresponding PUSCH is more than or equal to T_proc, $2+d_1+d_3$ or T'_proc,$2+d_1$. For example, the BS may schedule an HP PUSCH overlapping in time with an LP PUSCH such that the HP PUSCH starts at least after the time T_proc,$2+d_1+d_3$ elapses from the last symbol of a PDCCH scheduling transmission of the HP PUSCH.

Alternatively, for time delay reduction, when the UE performs prioritization between two PUSCHs having different priorities, the BS may perform scheduling by assuming that the UE expects only a case in which the distance from the end of a PDCCH scheduling a PUSCH with a larger (i.e., higher) priority to the start of the first symbol among symbols where the PUSCH with the higher priority overlaps with a PUSCH with a smaller (i.e., lower) priority is more than or equal to T_proc,$2+d_1+d_3$ or T'_proc,$2+d_1$. For example, the BS may perform scheduling such that the first symbol where an LP PUSCH and an HP PUSCH overlap starts at least after the time T_proc,$2+d_1+d_3$ elapses from the last symbol of a PDCCH scheduling transmission of the HP PUSCH. This may guarantee the distance from the PDCCH scheduling the HP PUSCH to a time point at which cancellation is actually required, thereby reducing a delay in higher priority scheduling.

The following may be considered in Implementation B1.

T_proc,$2=\max\{(N2+d_{2,1}+d_2)(2048+144)*\kappa 2^{-\mu}*T_c+T_{ext}+T_{switch}, d_{2,2}\}\}$ T'_proc,$2=\max\{(N2+d_{2,1}+d_2+d_3)(2048+144)*\kappa 2^{-\mu}*T_c+T_{ext}+T_{switch}, d_{2,2}\}\}$ T_proc,2 and T'_proc,2 are PUSCH preparation times for corresponding UE processing capabilities.

Assuming $d_{2,1}=0$, other parameters (e.g., $T_{ext}$, $T_{switch}$, $d_{2,2}$, etc.) except for N2 and $d_3$ are defined in Section 6.4 of 3GPP TS 38.214 V16.2.0.

$d_1$ may be determined by a reported UE capability.

N2 may be determined as described in 3GPP TS 38.214 V16.2.0 (see N2 in 3GPP TS 38.214 V16.2.0).

<Implementation B2> Additional UL Cancellation/Preparation Timeline for PUSCH Multiplexing When the UE selects and transmits one of two UL channels overlapping (in time) with each other and having different priorities, the BS may assume that the UE will determine the validity of H-PUSCH scheduling based on two PUSCH preparation times or scheduling times by considering an additional preparation time or scheduling time.

The additional preparation time or scheduling time may be defined in the form of an offset represented by the number of symbols, which may be predetermined or determined by L1 signaling or higher layer signaling between the UE and BS. The BS may assume that the UE will determine the validity of scheduling using the offset based on each of conventional timeline X and additional timeline Y.

For example, when the UE supports prioritization between two PUSCHs/PUCCHs having different priorities (i.e., between a PUSCH and a PUCCH having different priorities, between PUSCHs having different priorities, or between PUCCHs having different priorities), the UE may report an additional processing time $d_{priority}$ through capability signaling. The BS may perform scheduling and/or receive UL channel(s) by assuming that when the UE performs prioritization between PUSCH(s)/PUCCH(s) having different priorities, if the distance between the start of a PUSCH/PUCCH having a larger (i.e., higher) priority and the end of a PDCCH scheduling the corresponding PUSCH/PUCCH or related PDSCH is more than or equal to T_proc, $2+d_1$, the UE will determine that timeline X is satisfied. In addition, the BS may perform the scheduling and/or receive the UL channel(s) by assuming that if the distance is more than or equal to T_proc,$2+d_1+d_{priority}$ or T'_proc,$2+d_1$, the UE will determine that additional timeline Y is satisfied.

The following may be considered in Implementation B2.

T_proc,$2=\max\{(N2+d_{2,1}+d_2)(2048+144)*\kappa*2^{-u}*T_c+T_{ext}+T_{switch}, d_{2,2}\}$ T'_proc,$2=\max\{(N2+d_{2,1}+d_2+d_{priority})(2048+144)*\kappa*2^{-u}*T_c+T_{ext}+T_{switch}, d_{2,2}\}$ T_proc,2 and T'_proc,2 are PUSCH preparation times for corresponding UE processing capabilities.

Assuming $d_{2,1}=0$, other parameters (e.g., $T_{ext}$, $T_{swtich}$, $d_{2,2}$, etc.) except for N2 and $d_{priority}$ are defined in Section 6.4 of 3GPP TS 38.214 V16.2.0.

$d_1$ may be determined by a reported UE capability.

N2 may be determined as described in 3GPP TS 38.214 V16.2.0(see $N_2$ in 3GPP TS 38.214 V16.2.0).

In some implementations of the present disclosure, the BS may perform the following operations for resource allocation for the UE in consideration of timeline X and timeline Y.

Implementation B2-1

If two overlapping UL transmissions with different priorities satisfy timeline X but do not satisfy timeline Y, the UE may cancel transmission of a PUSCH or PUCCH with a smaller (i.e., lower) priority at least from the first symbol overlapping with a PUSCH or PUCCH with a larger (i.e., higher) priority among symbols of the PUSCH or PUCCH having the smaller priority, and the BS may expect that the UE will operate as described above.

Implementation B2-2

If two overlapping UL transmissions with different priorities satisfy both timeline X and timeline Y, and if a UL channel with a smaller (lower) priority is a PUCCH or PUSCH including UCI, the UE may multiplex and transmit the UCI included in the PUSCH or PUCCH having the smaller (lower) priority over a PUSCH or PUCCH having a larger (higher) priority, and the BS may expect that the UE will operate as described above.

In Implementation B2-2, timeline Y may be a time condition for enabling inter-priority multiplexing. That is, Implementation B2-2 may enable inter-priority UL multiplexing on a limited basis when a UL transmission with a larger (higher) priority is scheduled with a sufficient time, thereby preventing a problem that may occur when an LP PUSCH/PUCCH is canceled.

Implementation B3

If the UE receives a PDCCH that satisfies specific conditions after cancelling a PUSCH/PUCCH, the BS may assume that the UE will transmit the payload of the canceled PUSCH or PUCCH on a resource indicated by the corresponding PDCCH or a resource having the same intra-slot (or intra-subslot) position as the previously canceled PUSCH or PUCCH within a slot indicated by the corresponding PDCCH. If a PUCCH is canceled and if PUSCH scheduling satisfies the specific conditions, the BS may receive a PUSCH by assuming that the UE will transmit UCI supposed to be transmitted on the canceled PUCCH over the PUSCH. If a PUSCH is canceled and if PUSCH scheduling satisfies the specific conditions, the BS may perform UL reception by assuming that the UE will retransmit only a canceled portion of the PUSCH. For example, referring to FIG. 15, if the L-PUSCH transmission starts but is canceled before the H-PUSCH transmission starts, the BS may assume that only a portion of the L-PUSCH canceled due to the start of the H-PUSCH is retransmitted except for a portion transmitted before the L-PUSCH is canceled.

When a legacy UE or a UE using Implementation B2-1 performs prioritization between UL transmissions, the BS may perform UL reception by assuming that the UE will cancel all or part of an LP PUSCH/PUCCH. According to Implementation B3, the BS may directly receive UCI included in the canceled transmission of the UE through another transmission of the UE. In particular, according to Implementation B3, when a PUSCH/PUCCH including HARQ-ACK feedback is canceled, the BS may receive the HARQ-ACK feedback again, that is, receive the result of receiving a PDSCH associated with the canceled HARQ-ACK feedback, without scheduling retransmission of the associated PDSCH.

In Implementation B3, the following may be considered as the specific conditions.

The corresponding PDCCH is a PDCCH received first after symbols where transmission with a smaller (lower) priority is cancelled.

Specific field values of scheduling DCI match predetermined field values. For example, a type 1 resource allocation field in the scheduling DCI carried on the corresponding PDCCH is 0 and the value of an MCS is 31 (see 3GPP TS 38.212).

An RNTI for identifying a PDCCH that satisfies a specific condition is preconfigured, and the CRC of the corresponding PDCCH is scrambled with the corresponding RNTI. In this case, the corresponding PDCCH may be a group-common PDCCH. If the UE cancels transmission of a PUCCH/PUSCH, the BS may perform UL reception by assuming that the UE transmits the canceled PUCCH/PUSCH at a slot, which is determined by applying a predetermined or indicated slot or subslot offset to the time of receiving a PDCCH scheduling the canceled PUCCH/PUSCH, in the same way as that for the previously canceled transmission. For example, the BS may perform UL reception by assuming that retransmission of the canceled PUCCH/PUSCH is performed based on the same parameters (e.g., start symbol, the number of symbols, DM-RS location, antenna port, etc.) as the previously canceled transmission, except for the slot position for transmission.

Figure 19:
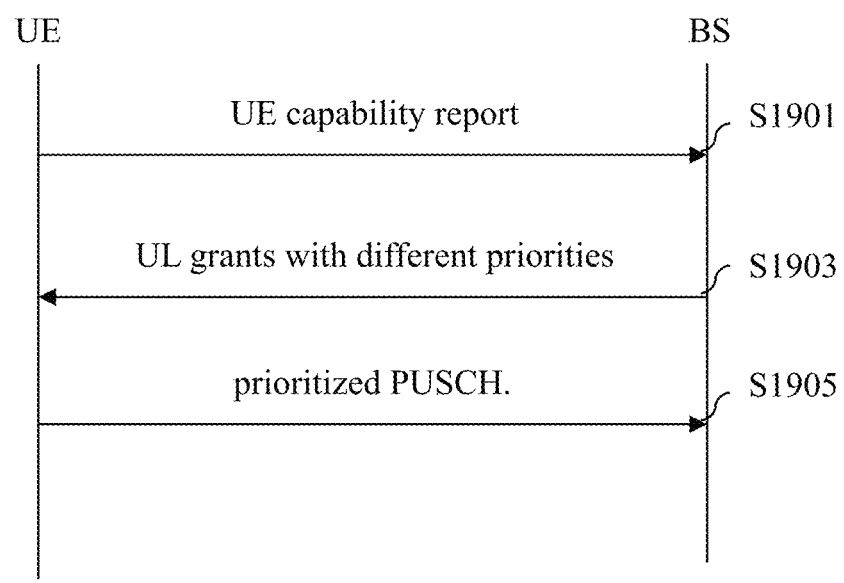
FIG. 19 illustrates a flow of signal transmission/reception between a UE and a BS according to some implementations of the present disclosure.

FIG. 19 illustrates a flow of signal transmission/reception between the UE and BS according to some implementations of the present disclosure.

The BS and UE may establish an RRC connection, and the UE may report UE capability information to the BS (S1901). The BS may transmit UL grants for allocating to the UE a plurality of PUSCH resources having different priorities and overlapping in time (S1903). The UE may perform prioritization and/or multiplexing based on the UL grants and timeline condition(s) according to some implementations of the present disclosure, and the BS may assume the prioritization and/or multiplexing to be performed by the UE. The UE may perform UL transmission on a prioritized PUSCH resource, and the BS may receive the UL transmission on the prioritized PUSCH resource (S1905).

According to some implementations of the present disclosure, when HP PUSCH transmission cancels other LP UL transmission, the BS and UE may allow the scheduling time of the HP PUSCH transmission to guarantee a sufficient time to cancel the other LP UL transmission as well as to minimize a time delay in URLLC transmission. According to some implementations of the present disclosure, the UE may be allowed to use a plurality of time lines (i.e., a plurality of time conditions), thereby reducing the implementation complexity of the UE as well as performing inter-priority UL multiplexing. In addition, the BS may be allowed to perform reception on an HP channel without requesting LP UCI again.

The UE may perform operations according to some implementations of the present disclosure in association with transmission of UL channel(s). The UE may include at least one transceiver; at least one processor; and at least one computer memory operably connectable to the at least one processor and storing instructions that, when executed, cause the at least one processor to perform operations according to some implementations of the present disclosure. A processing apparatus for the UE may include at least one processor; and at least one computer memory operably connectable to the at least one processor and storing instructions that, when executed, cause the at least one processor to perform operations according to some implementations of the present disclosure. A computer readable storage medium may store at least one computer program including instructions that, when executed by at least one processor, cause the at least one processor to perform operations according to some implementations of the present disclosure. A computer-readable (non-transitory) storage medium may store at least one computer program including instructions that, when executed by at least one processor, cause the at least one processor to perform the operations according to some implementations of the present disclosure. A computer program or computer program product may include instructions stored on at least one computer-readable (non-volatile) storage medium and, when executed, cause (at least one processor) to perform the operations according to some implementations of the present disclosure.

For the UE, processing device, computer-readable (non-volatile) storage medium, and/or computer program product, the operations may include: based on that a first PUCCH and a second PUCCH having a lower priority than a priority of the first PUCCH overlap in time with each other and that the first PUCCH satisfies a first time condition, performing transmission of the first PUCCH and canceling transmission of the second PUCCH; and based on that a first PUSCH and a second PUSCH having a lower priority than a priority of the first PUSCH overlap in time with each other and that the first PUSCH satisfies a second time condition, performing transmission of the first PUSCH and cancelling transmission of the second PUSCH. A time length T_B for the second time condition may be longer than a time length T_A for the first time condition.

In some implementations of the present disclosure, the operations may further include, based on that a third PUCCH and a fourth PUSCH having a lower priority than a priority of the third PUCCH overlap in time with each other and that the third PUCCH satisfies the first time condition, performing transmission of the third PUCCH and canceling transmission of the fourth PUSCH.

In some implementations of the present disclosure, the operations may further include, based on that a third PUSCH and a fourth PUCCH having a lower priority than a priority of the third PUSCH overlap in time with each other and that the third PUSCH satisfies the first time condition, performing transmission of the third PUSCH and canceling transmission of the fourth PUCCH.

In some implementations of the present disclosure, the operations may further include, based on that the first PUCCH overlapping in time with the second PUCCH satisfies the first time condition and does not satisfy the second time condition, multiplexing UCI included in the second PUCCH on the first PUCCH.

In some implementations of the present disclosure, the operations may further include, based on that the third PUSCH overlapping in time with the fourth PUCCH satisfies the first time condition and does not satisfy the second time condition, multiplexing UCI included in the fourth PUCCH on the third PUSCH.

In some implementations of the present disclosure, the first time condition may include the following: a time distance from a last symbol of a PDCCH scheduling a higher priority UL channel to a start of the higher priority uplink channel is greater than or equal to $T\_A = T\_proc,2 + d_1$, where $T\_proc,2$ is a PUSCH preparation time for a processing capability of the UE, and d1 is determined by a capability reported by the UE.

In some implementations of the present disclosure, the second time condition may include the following: the time distance from the last symbol of the PDCCH to the start of the higher priority uplink channel is greater than or equal to $T\_B = T\_proc,2 + d_1 + d_{add}$, where $T\_proc,2$ is the PUSCH preparation time for the processing capability of the UE, and d1 is determined by the capability reported by the UE.

The BS may perform operations according to some implementations of the present disclosure in relation to HARQ-ACK reception. The BS may include: at least one transceiver; at least one processor; and at least one computer memory operably connected to the at least one processor and configured to store instructions that, when executed, cause the at least one processor to perform the operations according to some implementations of the present disclosure. A processing device for a BS may include: at least one processor; and at least one computer memory operably connected to the at least one processor and configured to store instructions that, when executed, cause the at least one processor to perform the operations according to some implementations of the present disclosure. A computer-readable (non-transitory) storage medium may store at least one computer program including instructions that, when executed by at least one processor, cause the at least one processor to perform the operations according to some implementations of the present disclosure. A computer program or computer program product may include instructions stored on at least one computer-readable (non-volatile) storage medium and, when executed, cause (at least one processor) to perform the operations according to some implementations of the present disclosure.

For the BS, processing device, computer-readable (non-volatile) storage medium, and/or computer program product, the operations may include: based on that a first PUCCH and a second PUCCH having a lower priority than a priority of the first PUCCH overlap in time with each other and that the first PUCCH satisfies a first time condition, performing reception of the first PUCCH and canceling reception of the second PUCCH; and based on that a first PUSCH and a second PUSCH having a lower priority than a priority of the first PUSCH overlap in time with each other and that the first PUSCH satisfies a second time condition, performing reception of the first PUSCH and cancelling reception of the second PUSCH. A time length T_B for the second time condition may be longer than a time length T_A for the first time condition.

In some implementations of the present disclosure, the operations may further include, based on that a third PUCCH and a fourth PUSCH having a lower priority than a priority of the third PUCCH overlap in time and that the third PUCCH satisfies the first time condition, performing reception of the third PUCCH and canceling reception of the fourth PUSCH.

In some implementations of the present disclosure, the operations may further include, based on that a third PUSCH and a fourth PUCCH having a lower priority than a priority of the third PUSCH overlap in time and that the third PUSCH satisfies the first time condition, performing reception of the third PUSCH and canceling reception of the fourth PUCCH.

In some implementations of the present disclosure, the operations may further include, based on that the first PUCCH overlapping in time with the second PUCCH satisfies the first time condition and does not satisfy the second time condition, receiving UCI supposed to be received over the second PUCCH on the first PUCCH.

In some implementations of the present disclosure, the operations may further include, based on that the third PUSCH overlapping in time with the fourth PUCCH satisfies the first time condition and does not satisfy the second time condition, receiving UCI supposed to be received over the fourth PUCCH on the third PUSCH.

In some implementations of the present disclosure, the time length T_B may be longer than the time length T_A by $d_{add}$. In this case, $d_{add}$ may correspond to $d_3$ described in Implementation A1 of the present disclosure or $d_{priority}$ described in Implementation A2 of the present disclosure.

In some implementations of the present disclosure, the first time condition may include the following: a time distance from a last symbol of a PDCCH scheduling a higher priority UL channel to a start of the higher priority uplink channel is greater than or equal to $T\_A=T\_proc,2+d_1$, where $T\_proc,2$ is a PUSCH preparation time for a processing capability of the UE, and d1 is determined by a capability reported by the UE.

In some implementations of the present disclosure, the second time condition may include the following: the time distance from the last symbol of the PDCCH to the start of the higher priority uplink channel is greater than or equal to $T\_B=T\_proc,2+d_1+d_{add}$, where $T\_proc,2$ is the PUSCH preparation time for the processing capability of the UE, and d1 is determined by the capability reported by the UE.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

The implementations of the present disclosure may be used in a BS, a UE, or other equipment in a wireless communication system.

What is claimed is:

1. A method of transmitting an uplink (UL) channel by a user equipment (UE) in a wireless communication system, the method comprising:
    reporting UE capability information that includes i) information regarding a first additional number (d_1) of symbols needed for cancelling a lower priority UL transmission beyond a physical uplink shared channel (PUSCH) preparation time N_2, and ii) information regarding a second additional number (d_3) of symbols needed on top of N_2+d_1;
    detecting a downlink control information (DCI) format that schedules a transmission of a first uplink channel of larger priority; and
    for the transmission of the first uplink channel of larger priority that does not start before T after a last symbol of a physical downlink control channel (PDCCH) carrying the DCI format and based on a determination that the transmission of the first uplink channel of larger priority overlaps in time with a transmission of a second uplink channel of smaller priority,
        cancelling the transmission of the second uplink channel of smaller priority before an earliest symbol that overlaps the transmission of the first uplink channel of larger priority,
    wherein T is a preparation time related to cancellation for the second uplink channel of smaller priority,
    wherein T is determined based on d,
    wherein based on at least one of the first uplink channel of larger priority and the second uplink channel of smaller priority being a physical uplink control channel (PUCCH), d is equal to d_1, where d_1 is determined by the reported UE capability information, and
    wherein based on the first uplink channel of larger priority and the second uplink channel of smaller priority being a first PUSCH of larger priority and a second PUSCH of smaller priority, respectively, d is equal to d_1+d_3, where d_1 and d_3 are determined by the reported UE capability information.

2. The method of claim 1, wherein the second PUSCH is a configured grant based PUSCH without a corresponding PDCCH.

3. The method of claim 1, further comprising:
performing the transmission of the first uplink channel of larger priority.

4. The method of claim 1, wherein T is determined based on $N\_2+d$, where $N\_2$ is the PUSCH preparation time predefined for a processing capability of the UE.

5. The method of claim 4, wherein $N\_2$ is based on a subcarrier spacing configuration u, where u is one of u_DL and u_UL which results with a largest T, where u_DL corresponds to a downlink subcarrier spacing with which the PDCCH carrying the DCI format is transmitted and u_UL corresponds to a uplink subcarrier spacing with which the first uplink channel is to be transmitted.

6. A user equipment (UE) configured to transmit an uplink (UL) channel in a wireless communication system, the UE comprising:
at least one transceiver;
at least one processor; and
at least one computer memory operably connected to the at least one processor and configured to store instructions that, when executed, cause the at least one processor to perform operations comprising:
reporting UE capability information that includes i) information regarding a first additional number (d_1) of symbols needed for cancelling a lower priority UL transmission beyond a physical uplink shared channel (PUSCH) preparation time N_2, and ii) information regarding a second additional number (d_3) of symbols needed on top of N_2+d_1;
detecting a downlink control information (DCI) format that schedules a transmission of a first uplink channel of larger priority; and
for the transmission of the first uplink channel of larger priority that does not start before T after a last symbol of a physical downlink control channel (PDCCH) carrying the DCI format and based on a determination that the transmission of the first uplink channel of larger priority overlaps in time with a transmission of a second uplink channel of smaller priority,
cancelling the transmission of the second uplink channel of smaller priority before an earliest symbol that overlaps the transmission of the first uplink channel of larger priority,
wherein T is a preparation time related to cancellation for the second uplink channel of smaller priority,
wherein T is determined based on d,
wherein based on at least one of the first uplink channel of larger priority and the second uplink channel of smaller priority being a physical uplink control channel (PUCCH), d is equal to d_1, where d_1 is determined by the reported UE capability information, and
wherein based on the first uplink channel of larger priority and the second uplink channel of smaller priority being a first PUSCH of larger priority and a second PUSCH of smaller priority, respectively, d is equal to d_1+d_3, where d_1 and d_3 are determined by the reported UE capability information.

7. The UE of claim 6, wherein the second PUSCH is a configured grant based PUSCH without a corresponding PDCCH.

8. The UE of claim 6, wherein the operations further comprise:
performing the reception of the first uplink channel of larger priority.

9. The UE of claim 6, wherein T is determined based on N_2+d, where N_2 is the PUSCH preparation time predefined for a processing capability of the UE.

10. The UE of claim 9, wherein N_2 is based on a subcarrier spacing configuration u, where u is one of u_DL and u_UL which results with a largest T, where u_DL corresponds to a downlink subcarrier spacing with which the PDCCH carrying the DCI format is transmitted and u_UL corresponds to a uplink subcarrier spacing with which the first uplink channel is to be transmitted.

11. A base station (BS) configured to receive an uplink (UL) channel from a user equipment (UE) in a wireless communication system, the BS comprising:
at least one transceiver;
at least one processor; and
at least one computer memory operably connected to the at least one processor and configured to store instructions that, when executed, cause the at least one processor to perform operations comprising:
receiving, from the UE, UE capability information that includes i) information regarding a first additional number (d_1) of symbols needed for cancelling a lower priority uplink (UL) transmission beyond a physical uplink shared channel (PUSCH) preparation time N_2, and ii) information regarding a second additional number (d_3) of symbols needed on top of N_2+d_1;
transmitting, to the UE, a downlink control information (DCI) format that schedules a first uplink channel of larger priority; and
for a reception of the first uplink channel of larger priority that does not start before T after a last symbol of a physical downlink control channel (PDCCH) carrying the DCI format and based on a determination that the reception of the first uplink channel of larger priority overlaps in time with a reception of a second uplink channel of smaller priority,
cancelling the reception of the second uplink channel of smaller priority before an earliest symbol that overlaps the reception of the first uplink channel of larger priority,
wherein T is a preparation time related to cancellation for the second uplink channel of smaller priority,
wherein T is determined based on d,
wherein based on at least one of the first uplink channel of larger priority and the second uplink channel of smaller priority being a physical uplink control channel (PUCCH), d is equal to d_1, where d_1 is determined by the received UE capability information, and
wherein based on the first uplink channel of larger priority and the second uplink channel of smaller priority being a first PUSCH of larger priority and a second PUSCH of smaller priority, respectively, d is equal to d_1+d_3, where d_1 and d_3 are determined by the received UE capability information.

12. The BS of claim 11, wherein the second PUSCH is a configured grant based PUSCH without a corresponding PDCCH.

13. The BS of claim 11, wherein the operations further comprise:
performing the reception of the first uplink channel of larger priority.

14. The BS of claim 11, wherein T is determined based on N_2+d, where N_2 is the PUSCH preparation time predefined for a processing capability of the UE.

15. The BS of claim 14, wherein N_2 is based on a subcarrier spacing configuration u, where u is one of u_DL and u_UL which results with a largest T, where u_DL corresponds to a downlink subcarrier spacing with which the PDCCH carrying the DCI format is transmitted and u_UL corresponds to a uplink subcarrier spacing with which the first uplink channel is to be transmitted.

* * * * *